(12) United States Patent
Onda et al.

(10) Patent No.: US 9,990,437 B2
(45) Date of Patent: Jun. 5, 2018

(54) SERVER SYSTEM FOR SHARING GAME PLAY VIDEOS

(71) Applicants: BANDAI NAMCO ENTERTAINMENT INC., Tokyo (JP); BANDAI NAMCO STUDIOS INC., Tokyo (JP)

(72) Inventors: Akio Onda, Warabi (JP); Hiroyuki Nashida, Yokohama (JP); Kiyoshi Minami, Yokohama (JP)

(73) Assignees: BANDAI NAMCO ENTERTAINMENT INC., Tokyo (JP); BANDAI NAMCO STUDIOS INC., Tokyo (JP)

( * ) Notice: Subject to any disclaimer, the term of this patent is extended or adjusted under 35 U.S.C. 154(b) by 10 days.

(21) Appl. No.: 15/073,202

(22) Filed: Mar. 17, 2016

(65) Prior Publication Data
US 2016/0287987 A1    Oct. 6, 2016

(30) Foreign Application Priority Data
Mar. 30, 2015    (JP) .................................. 2015-070058

(51) Int. Cl.
*A63F 9/24*       (2006.01)
*G06F 17/30*      (2006.01)
*A63F 13/86*      (2014.01)

(52) U.S. Cl.
CPC ........ *G06F 17/30867* (2013.01); *A63F 13/86* (2014.09); *G06F 17/3082* (2013.01)

(58) Field of Classification Search
CPC .......... A63F 2300/554; A63F 2300/634; G06F 17/30867
See application file for complete search history.

(56) References Cited

U.S. PATENT DOCUMENTS

| | | | |
|---|---|---|---|
| 2003/0157985 A1* | 8/2003 | Shteyn ................... | A63F 13/10 463/42 |
| 2011/0107220 A1* | 5/2011 | Perlman .................. | A63F 13/12 715/720 |

(Continued)

FOREIGN PATENT DOCUMENTS

| | | |
|---|---|---|
| JP | 2015-013101 A | 1/2015 |
| JP | 2015-013102 A | 1/2015 |

OTHER PUBLICATIONS

"Youtube Video_Game_Walkthrough", 2010-2014, YouTube, at https://web.archive.org/web/20101005031937/http://www.youtube.com:80/user/sthaqu, (last uploaded Jun. 21, 2017).*

*Primary Examiner* — Steve Rowland
(74) *Attorney, Agent, or Firm* — Oliff PLC

(57) ABSTRACT

A server system regularly accesses a video database, searches the video database for a game play video of an online game provided by the server system based on a cyclic check keyword, and stores (manages) access information about the game play video, video-related information, a view count, and the like as cyclic check result data. When the server system has received an inquiry about the game play video of the online game from a user terminal that executes the online game, the server system searches the cyclic check result data and the like for the access information about the game play video that is appropriate for the play state, and returns the access information. The server system gives a bonus to the user (player) of the game play video of which the view count has reached a reference value.

23 Claims, 26 Drawing Sheets

(56) References Cited

U.S. PATENT DOCUMENTS

| | | | | |
|---|---|---|---|---|
| 2012/0100910 A1* | 4/2012 | Eichorn | ............... | A63F 13/497 |
| | | | | 463/31 |
| 2014/0187323 A1* | 7/2014 | Perry | .................... | A63F 13/10 |
| | | | | 463/31 |
| 2016/0001183 A1* | 1/2016 | Harvey | ............... | A63F 13/798 |
| | | | | 463/4 |
| 2016/0182956 A1* | 6/2016 | Kim | .................... | A63F 13/533 |
| | | | | 725/32 |

* cited by examiner

SERVER SYSTEM FOR SHARING GAME PLAY VIDEOS

Japanese Patent Application No. 2015-070058 filed on Mar. 30, 2015, is hereby incorporated by reference in its entirety.

BACKGROUND

The present invention relates to a server system that can communicate with a user terminal and a video database.

In recent years, it has become possible to view a game play video (i.e., a video in which another player performs game play) (e.g., through video distribution) by utilizing the Internet environment.

For example, a video site or a video-sharing service distributes the posted video data to the public utilizing a video database. For example, when one player has posted a game play video to the video site optionally after adding the poster's comments or on-the-spot comments, another player who has searched the video site for the desired game play video views the game play video, and adds viewer's comments to the game play video, or plays the game using the game play video as a reference.

Technology that utilizes a dedicated posting server having a replay data posting reception function and a replay data distribution function instead of a video site is also known (see JP-A-2015-13101 and JP-A-2015-13102, for example). For example, when one player has posted the replay data to the posting server using his/her game device, another player receives the replay data from the posting server, and views the replay image using his/her game device.

The sharing of the game play video has a favorable effect on the community of players who play the same game. For example, it is considered that each player is motivated to improve his/her skill in view of the game play video, and praise comments on his/her game play video will improve the motivation to play the game. It is also possible to motivate the players to communicate with each other through the comments on the game play.

SUMMARY

According to one aspect of the invention, there is provided a server system comprising:

a communication section that communicates with a video database through a communication line, the video database providing a game play video through the communication line so as to be viewable, the game play video being linked video-related information, the video-related information being at least one of 1) information that was input by an uploader and 2) information that was input automatically;

a search target information management section that manages search target information that is used to search the video database for the game play video based on the video-related information;

a reception section that receives a search request from a first user terminal;

a search section that searches the video database for the game play video while searching for the search target information that corresponds to the search request; and a return section that returns access information to the first user terminal, the access information being information that is used to access the video database for viewing the game play video found by the search section.

DESCRIPTION OF EXEMPLARY EMBODIMENTS

Figure 1:
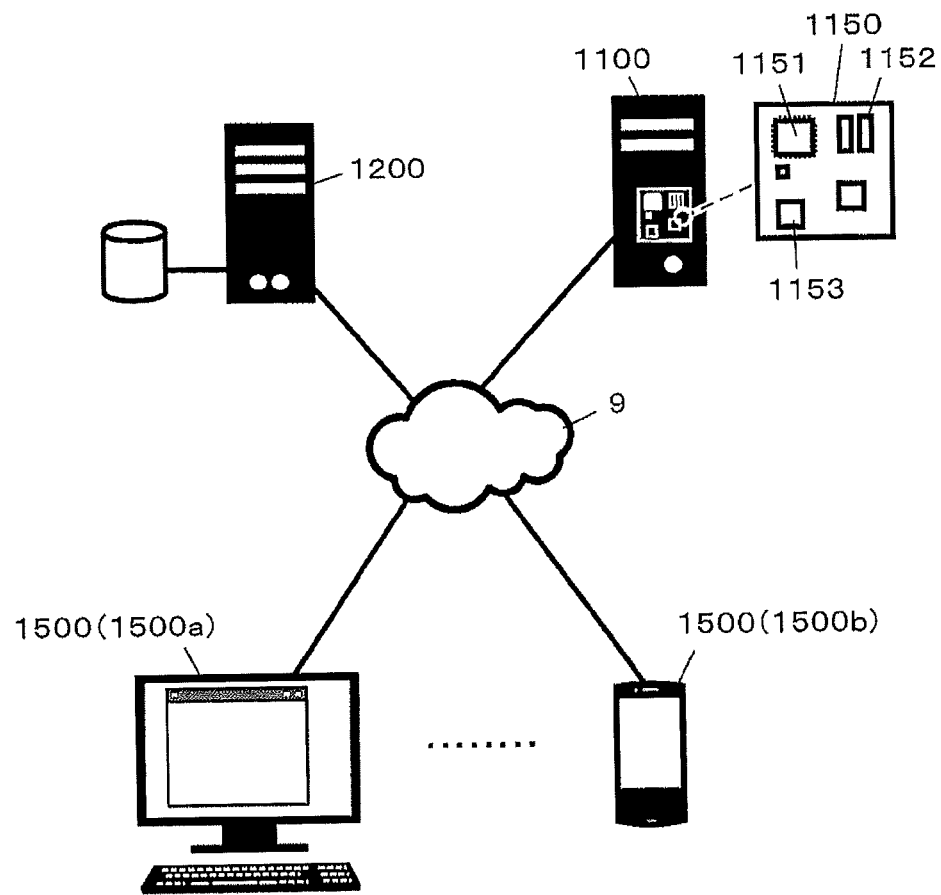
FIG. 1 is a view illustrating an example of the configuration of a game system.

Several embodiments of the invention may make it possible to provide novel game play video-sharing technology.

According to one embodiment of the invention, there is provided a server system comprising:

a communication section that communicates with a video database through a communication line, the video database providing a game play video through the communication line so as to be viewable, the game play video being linked video-related information, the video-related information being at least one of 1) information that was input by an uploader and 2) information that was input automatically;

a search target information management section that manages search target information that is used to search the video database for the game play video based on the video-related information;

a reception section that receives a search request from a first user terminal;

a search section that searches the video database for the game play video while searching for the search target information that corresponds to the search request; and a return section that returns access information to the first user terminal, the access information being information that is used to access the video database for viewing the game play video found by the search section.

In the server system, wherein the search section may search the video database for the game play video while searching for the video-related information that corresponds to game play information about game play performed using the first user terminal based on the search target information.

In the server system, wherein the search target information management section may manage the search target information based on the video-related information.

In the server system, wherein the video database may manage viewing information that includes at least a view count of each game play video, and the search target information management section may manage the search target information based on the viewing information.

According to the above configurations, the server system communicates with the video database, and automatically collects the access information about the game play video. When the server system has received the game play video search request from the player, the server system provides the access information that has been collected. This makes it possible to provide novel game play video-sharing technology, and improve convenience.

In the server system, wherein the return section may return at least the access information about the game play video of which the view count has satisfied a given higher-order condition.

According to this configuration, it is possible to return the access information about the game play video having a large (high) view count (i.e., popular game play video), and further improve convenience.

In the server system, wherein the search section may search the video database for the game play video while searching for the search target information that corresponds to the search request based on the viewing information.

According to this configuration, it is possible to search for the search target information based on the viewing information.

The server system may further comprise:

an upload request reception section that receives an upload request from a second user terminal, the upload request designating an upload target video and upload target video-related information, the upload target video being the game play video that is desired to be uploaded, and the upload target video-related information being the video-related information that is linked to the upload target video; and an upload section that uploads the upload target video and the upload target video-related information to the video database.

According to this configuration, it is possible to upload the upload target video and the upload target video-related information received from the second user terminal to the video database.

In the server system, wherein the upload target video-related information may include information that represents the uploader who desires to upload the upload target video.

According to this configuration, it is possible to use the upload target video-related information that includes the information that represents the uploader when uploading the upload target video to the video database.

The server system may further comprise:

a compatibility determination section that determines whether or not the upload target video and the upload target video-related information designated by the upload request received by the upload request reception section satisfy a given compatibility condition, wherein the upload section may upload the upload target video and the upload target video-related information that have been determined by the compatibility determination section to satisfy the compatibility condition to the video database.

According to this configuration, it is possible to ensure compatibility between the upload target game play video (upload target video) and the video-related information (upload target video-related information) linked to the upload target game play video.

In the server system, the server system may have a game server function, and may further comprise:

an upload target video generation section that generates an upload target video based on game play performed using a second user terminal managed by the game server function, the upload target video being the game play video that is to be uploaded;

an upload target video-related information generation section that generates upload target video-related information, the upload target video-related information being the video-related information that is linked to the upload target video; and an upload section that uploads the upload target video and the upload target video-related information to the video database in a linked manner.

According to this configuration, it is possible to generate the upload target video and the video-related information based on game play performed using the user terminal, and upload the upload target video and the video-related information. This makes it possible to further improve convenience.

The server system may further comprise:

a first bonus-giving processing section that performs a first bonus-giving process that gives a given bonus to the uploader who uploaded the game play video when management information about the game play video managed by the video database has satisfied a given bonus-giving condition.

In the server system, wherein the management information may include at least a view count of the game play video, and the first bonus-giving processing section may determine whether or not the management information has satisfied the bonus-giving condition using the view count, and may give the given bonus to the uploader who uploaded the game play video for which the management information has satisfied the bonus-giving condition.

According to this configuration, it is possible to give a bonus to the user who is the player of the uploaded game play video (i.e., uploader (i.e., a user who performed the game play included in the video)). This makes it possible to further motivate the user to more positively upload and share the game play video.

In the server system, the server system may have a game server function, and may further comprise:

a reproduction determination section that determines whether or not game play performed using the first user terminal managed by the game server function after the return section has returned the access information to the first user terminal has satisfied a given reproduction condition referring to the video-related information linked to the game play video, the given reproduction condition being satisfied when the game play performed using the first user terminal is identical or similar to game play included in the game play video that is linked to the video-related information; and a reproduction determination result notification control section that notifies the first user terminal that the game play performed using the first user terminal has satisfied the given reproduction condition when the reproduction determination section has determined that the game play performed using the first user terminal has satisfied the given reproduction condition.

According to this configuration, when it has been determined that the game play included in the game play video viewed by the user of the first user terminal was reproduced by the user, the user of the first user terminal is notified that the game play included in the game play video was reproduced by the user. Specifically, it is possible to confirm that the game play included in the game play video could be reproduced by the user. This makes it possible to motivate the user to play the game, and share the game play video.

In the server system, the server system may have a game server function, and may further comprise:

a reproduction determination section that determines whether or not game play performed using the first user terminal managed by the game server function after the return section has returned the access information to the first user terminal has satisfied a given reproduction condition referring to the video-related information linked to the game play video, the given reproduction condition being satisfied when the game play performed using the first user terminal is identical or similar to game play included in the game play video that is linked to the video-related information; and a second bonus-giving processing section that performs a second bonus-giving process that gives a given bonus to a user of the second user terminal who is linked to the game play video when the reproduction determination section has determined that the given reproduction condition has been satisfied, and the game play video subjected to the determination is a video that was uploaded by the upload section.

According to this configuration, it is possible to give a bonus to the user who uploaded the game play video when it has been determined that the game play included in the game play video was reproduced by the user who viewed the game play video. This makes it possible to further motivate the user to more positively upload and share the game play video.

In the server system, the server system may have a game server function, and may further comprise:

a value determination section that determines whether or not game play performed using the first user terminal managed by the game server function after the return section has returned the access information to the first user terminal has satisfied a given value condition referring to the video-related information linked to the game play video, the given value condition being satisfied when a play result of the game play performed using the first user terminal was identical to, or better than, that of game play included in the game play video that is linked to the video-related information; and a third bonus-giving processing section that performs a third bonus-giving process that gives a given bonus to a user of the second user terminal who is linked to the game play video when the value determination section has determined that the given value condition has been satisfied, and the game play video subjected to the determination is a video that was uploaded by the upload section.

According to this configuration, it is possible to give a bonus to the user who is the player of the viewed game play video when the viewed game play video was useful for another user to play the game. This makes it possible to further motivate the user to more positively upload and share the game play video.

In the server system, the server system may have a game server function, and may further comprise:

a trial determination section that determines whether or not game play performed using the first user terminal managed by the game server function after the return section has returned the access information to the first user terminal has satisfied a given trial condition referring to the video-related information linked to the game play video, the given trial condition being satisfied when the game play performed using the first user terminal was in line with game play included in the game play video that is linked to the video-related information; and a fourth bonus-giving processing section that performs a fourth bonus-giving process that gives a given bonus to a user of the second user terminal who is linked to the game play video when the trial determination section has determined that the given trial condition has been satisfied, and the game play video subjected to the determination is a video that was uploaded by the upload section.

In the server system, wherein the fourth bonus-giving processing section may change the bonus that is given to the user corresponding to a trial play time or a trial play count of the game play performed using the first user terminal for which the trial determination section has determined that the given trial condition has been satisfied.

According to this configuration, it is possible to determine whether or not the user of the first user terminal tried to reproduce the game play included in the viewed game play video, and give a bonus to the user who uploaded the game play video when the user of the first user terminal tried to reproduce the game play included in the viewed game play video. This makes it possible to further motivate the user to more positively upload and share the game play video.

Note that the details of the video-related information can be appropriately set.

In the server system, wherein the video-related information may include at least one of a game title, a game category, a game stage, and play result information.

According to this configuration, the server system can be applied to various types of games, and it is possible to improve versatility.

The server system may further comprise the video database.

According to this configuration, the video database can be implemented as part of the server system.

In the server system, wherein the video-related information may be stored in the video database in an encoded state, the server system may further comprise a decoder section that decodes the encoded video-related information.

According to this configuration, it is possible to appropriately encode the video-related information.

Exemplary embodiments to which the invention is applied are described below taking an example in which players share a game play video of an online game.

FIG. 1 is a view illustrating an example of the configuration of a game system according to a first embodiment of the invention. The game system according to the first embodiment includes a server system 1100, a video database 1200, and a user terminal 1500 that can connect to a communication line 9, and exchange data (perform data communication).

The communication line 9 is a data communication channel. Specifically, the communication line 9 includes a communication network such as a local area network (LAN) using a private line (private cable) for direct connection, Ethernet (registered trademark), and the like, a telecommunication network, a cable network, and the Internet. The communication method may be either or both of a cable communication method and a wireless communication method.

The server system 1100 includes a control board 1150. The control board 1150 is provided with a microprocessor (e.g., central processing unit (CPU) 1151, graphics processing unit (GPU), and digital signal processor (DSP)), an IC memory 1152 (e.g., VRAM, RAM, and ROM), and a communication device 1153. Note that part or the entirety of the control board 1150 may be implemented by an application-specific integrated circuit (ASIC), a field-programmable gate array (FPGA), or a system-on-a-chip (SoC).

The server system 1100 is configured so that the control board 1150 performs a calculation process based on a given program and data to implement 1) a user management function (e.g., user registration function), and 2) a game management function that provides data necessary for the player (i.e., user) to play the game using the player terminal 1500. Specifically, the video game according to the first embodiment is implemented as a client-server online game.

The server system 1100 according to the first embodiment also implements 3) a function that cyclically checks the video database 1200, and automatically collects information about a game play video relating to the online game provided by the server system 1100, 4) a video posting function that posts a game play video to the video database 1200, 5) a function that provides the player with access information about the game play video posted to the video database 1200, 6) a function that gives a bonus to the player who posted the game play video to the video database 1200 based on the results of access to the game play video posted to the video database 1200, and 7) a function that gives a bonus to the player who posted the game play video viewed using the user terminal 1500 based on the relationship between the game play video viewed using the user terminal 1500 and the game play result.

In the example illustrated in FIG. 1, the server system 1100 is provided as a single server system. Note that the server system 1100 may have a configuration in which a plurality of blade servers that take charge of part of the functions are provided, and connected to each other so as to be able to exchange data through an internal bus. Alternatively, the functions of the server system 1100 may be implemented by causing a plurality of independent servers provided in remote locations to exchange data through the communication line 9.

The video database 1200 is a server system that provides a video site or a video-sharing service. A known video database may be used as the video database 1200, or a dedicated database that is implemented as a function of the server system 1100 may be used as the video database 1200.

The user terminal 1500 (1500a, 1500b, ...) is a computer that is used by the player to play the game, and can access the server system 1100 through the communication line 9 to execute the online game. Note that the user terminal 1500 can also access the video database 1200, and the player can view the video posted to the video database 1200.

The user terminal 1500 is not particularly limited. For example, the user terminal 1500 may be a device that is classified as a smartphone, a portable game device, a stationary consumer game device, a game controller for a stationary consumer game device, an arcade game device, a personal computer, a tablet computer, a wearable computer, or the like.

Outline of Functions

Figure 2:
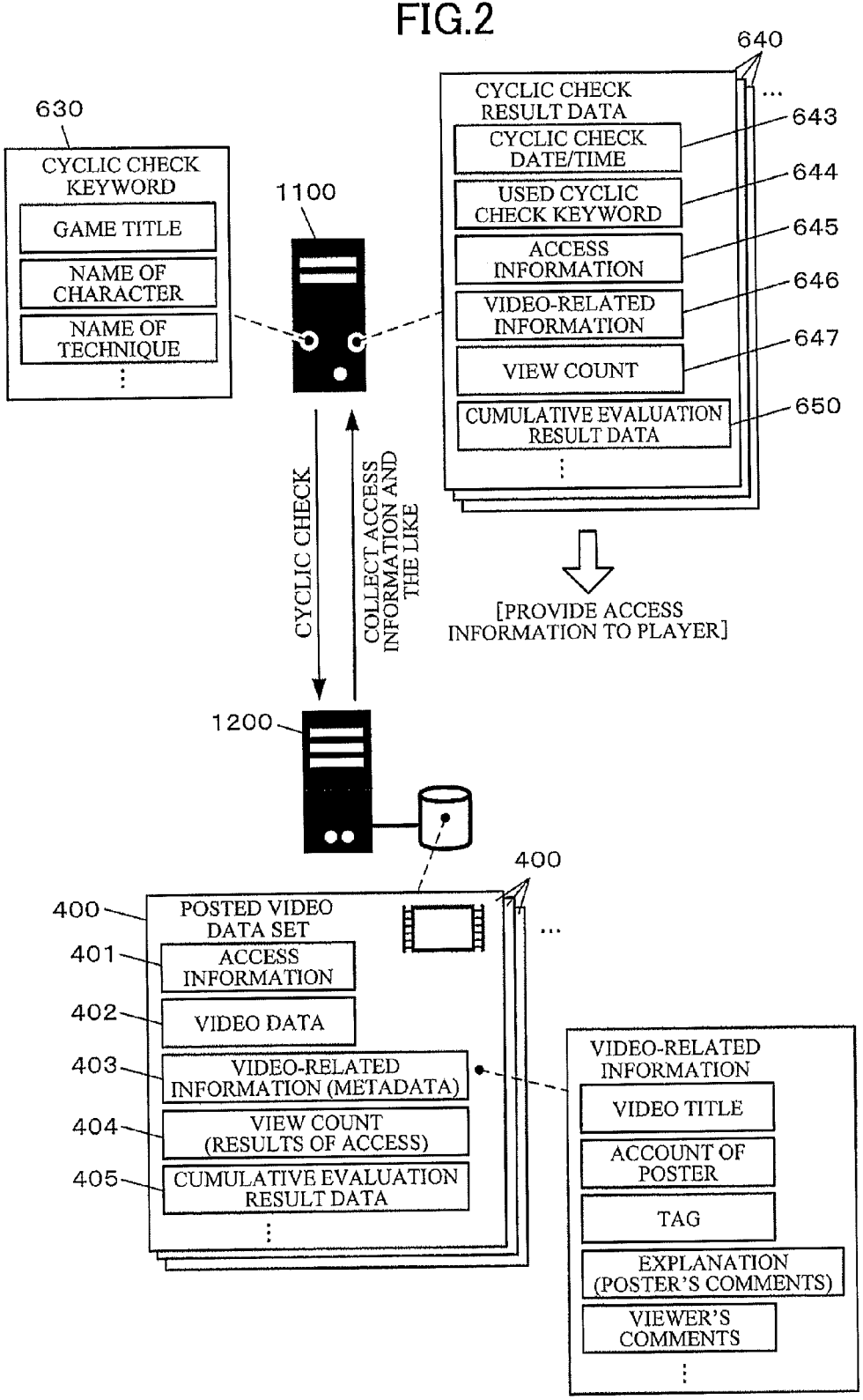
FIG. 2 is a view illustrating a function of a server system that cyclically checks a video database, and automatically collects information about a game play video relating to an online game provided by the server system.

FIG. 2 is a view illustrating the function of the server system 1100 according to the first embodiment that cyclically checks the video database 1200, and automatically collects information about a game play video relating to the online game provided by the server system 1100.

The video database 1200 assigns specific access information 401 (e.g., URL, IP address, or route information) to each video posted (uploaded) to the video database 1200 to generate and manage a posted video data set 400.

The configuration of the posted video data set 400 is appropriately set by the video database 1200. For example, the posted video data set 400 includes access information 401, video data 402 (i.e., the posted video data or video data that is generated by converting/compressing the posted video data into a given data format), video-related information 403, a view count 404 that represents the results of access to the video, and cumulative evaluation result data 405.

The video-related information 403 is a group of information (metadata) that indexes the video data 402. The video-related information 403 includes at least information input by the poster (uploader) or information input automatically. Examples of the information input by the poster include a video title, a poster's account, a tag, and poster's comments (e.g., explanation of the video and impressions of the video (input by the poster)). Examples of the information input automatically include a video classification, viewer's comments on the video, and the like.

Although FIG. 2 illustrates an example in which the video-related information 403 and the video data 402 are provided separately, the video-related information 403 may be included in the video data 402 depending on the configuration of the database or the data management method.

The cumulative evaluation result data 405 includes the results of evaluation by the viewer(s) after the video has been published. For example, the cumulative evaluation result data 405 may include the total number of times that the viewer(s) performed a given praise operation input while viewing the video, the distribution and the cumulative value of the evaluation points input by the viewer(s) after viewing the video, and the like.

The server system 1100 stores a cyclic check keyword list 630.

The cyclic check keyword list 630 is appropriately set corresponding to the game so as to be suitable for searching the video database 1200 for a game play video relating to the online game provided by the server system 1100. For example, when the online game is a role-playing game (RPG), the cyclic check keyword list 630 may include a game title, the names of characters and items that appear in the game, the name of a dungeon, the name of a stage and the name of a place where a key trap or mechanism is provided, a highlight scene term, and the like.

The server system 1100 regularly (periodically) accesses the video database 1200.

For example, when the video database 1200 is a video site based on Internet connection, the server system 1100 accesses the video site using automatic web browsing technology. When the server system 1100 has accessed the video site, the server system 1100 acquires page description data (e.g., HTML data). The server system 1100 performs a search process on the text data included in the page description data using the cyclic check keyword list 630 to find a web page for viewing the target game play video.

The server system 1100 automatically accesses the web page found by the search process. The data such as the page description data acquired by accessing (reading) the web page includes the access information 401, the video-related information 403, the view count 404, and the cumulative evaluation result data 405 (that correspond to the video posted to the web page), and the server system 1100 generates and stores cyclic check result data 640 in which the above information and the cyclic check keyword are linked.

Specifically, the cyclic check result data 640 is generated corresponding to each game play video. The cyclic check result data 640 includes a cyclic check date/time 643, a used cyclic check keyword 644, access information 645, video-related information 646, a view count 647, and cumulative evaluation result data 650. Note that the cyclic check result data 640 may appropriately include additional data.

The stored cyclic check result data 640 (i.e., one piece or a plurality of pieces of cyclic check result data 640) is provided to answer an inquiry about the game play video from the user terminal 1500. Specifically, the server system 1100 can collect the information about the game play video posted to the video database 1200 in place of the player, and provide the collected information to the player. This makes it unnecessary for the player to search each video database 1200 for the desired game play video. Therefore, it is convenient to the player.

Figure 3:
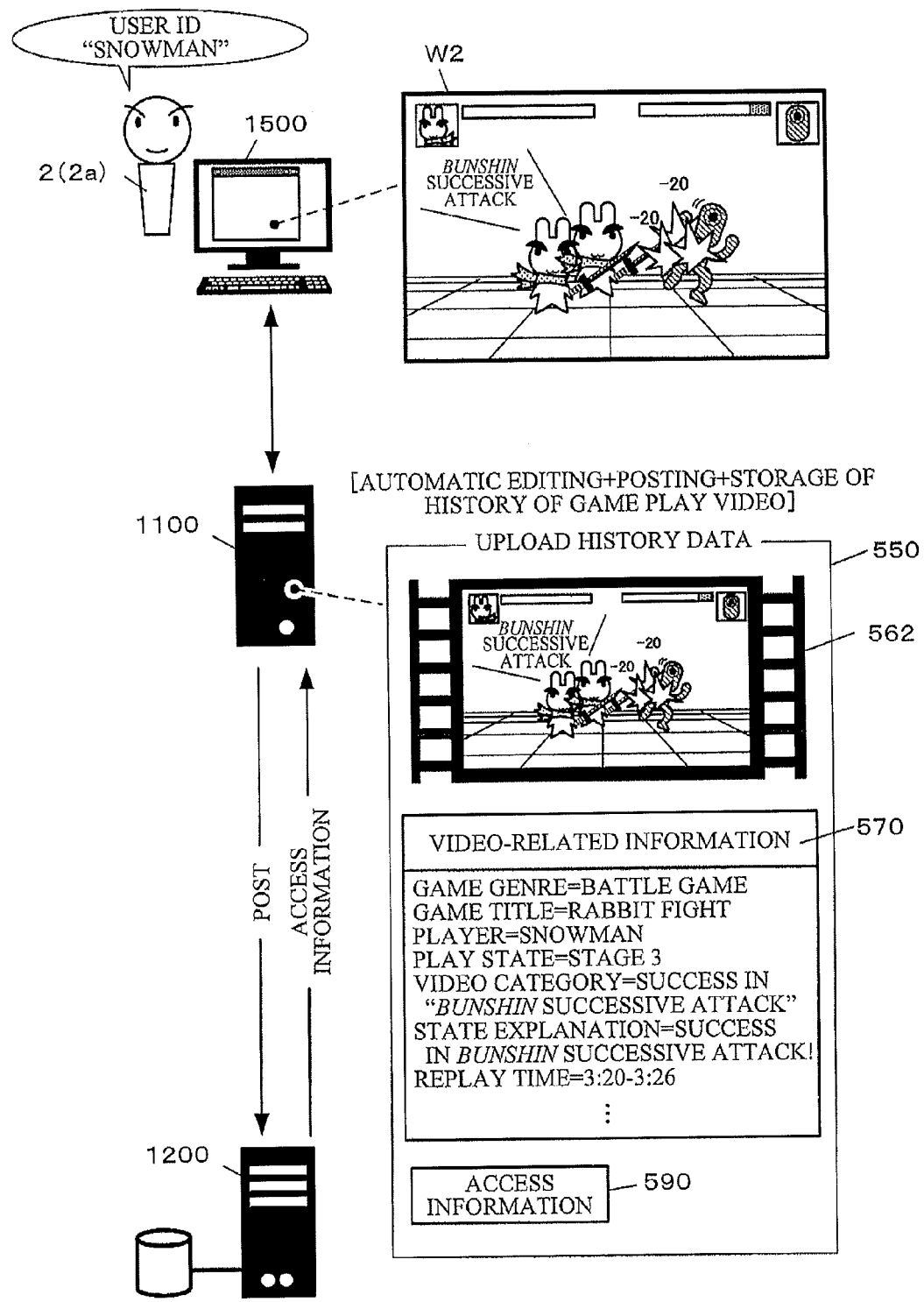
FIG. 3 is a view illustrating a first video posting function (that is implemented by a server system) that uploads (posts) a game play video to a video database.

FIG. 3 is a view illustrating a first video posting function that is implemented by the server system 1100 according to the first embodiment, and posts the game play video to the video database 1200.

A user 2 (player) of the user terminal 1500 accesses the server system 1100 using a user ID acquired in advance, and plays the online game. The server system 1100 stores replay data during game play.

The term "replay data" used herein refers to various types of data that are necessary for replaying the game play. For example, the replay data includes data that represents the history of operation inputs (operation inputs that operate the player character) performed by the user 2 (player), and data that represents the history of operation inputs (operation inputs that operate the non-player character (NPC)) automatically performed by the computer.

The server system 1100 refers to the replay data, automatically generates a game play video 562 that corresponds to a scene in which the play state satisfies a given video generation condition, and automatically generates video-related information 570 that is attached to the game play video. The server system 1100 then posts (uploads) the game play video 562 and the video-related information 570 to the video database 1200.

The term "video generation condition" used herein refers to a condition that defines a play state that corresponds to a highlight scene. The video generation condition can be appropriately set taking account of the details of the game and the like. The term "video generation condition" used herein may be interchangeably referred to as "definition of highlight". The video generation condition that corresponds to the highlight scene may be appropriately set corresponding to the details of the game. For example, the video generation condition corresponds to a scene in which the game stage has been cleared, a scene in which a special technique has been used, a scene in which super play that is very difficult to use or reproduce has been used, or the like.

The details of the video generation condition is described using one parameter or a plurality of parameters selected from the names of the characters and the items that appear in the game, the name of the dungeon, the name of the stage and the name of the place where the key trap or mechanism is provided, and the highlight scene term that are included in the cyclic check keyword list 630 (see FIG. 2).

The video-related information 570 is information that represents the origin and the contents of the game play video (i.e., information that represents the player who posted the game play video, the date/time at which the game play video was posted, the play condition, and the contents of the game play video).

For example, the video-related information 570 includes 1) the game genre, 2) the game title, 3) the play date/time, 4) the user ID of the player, 5) information about the play state (e.g., the stage ID, and the type and the number of enemy characters that appeared), 6) the video category (i.e., the genre that corresponds to the contents of the game play video), 7) a description that simply describes the contents of the game play video (e.g., the name of the technique used, the number of combos, and the item used), 8) the replay timing, and the like. Note that the video-related information 570 may appropriately include additional information (e.g., effect display, effect sound, second sound channel, and comments that represent the player's impressions).

When the game play video 562 and the like are posted (uploaded) to the video database 1200, the video database 1200 sets and returns the access information about the game play video. The server system 1100 links the video-related information 570 to the received access information 590, and generates (stores) upload history data 550.

The access information 590 is information (e.g., URL, IP address, and route information) that makes it possible to directly locate the target game play video. The access information 590 may be appropriately set taking account of the configuration of the video database 1200.

Figure 4:
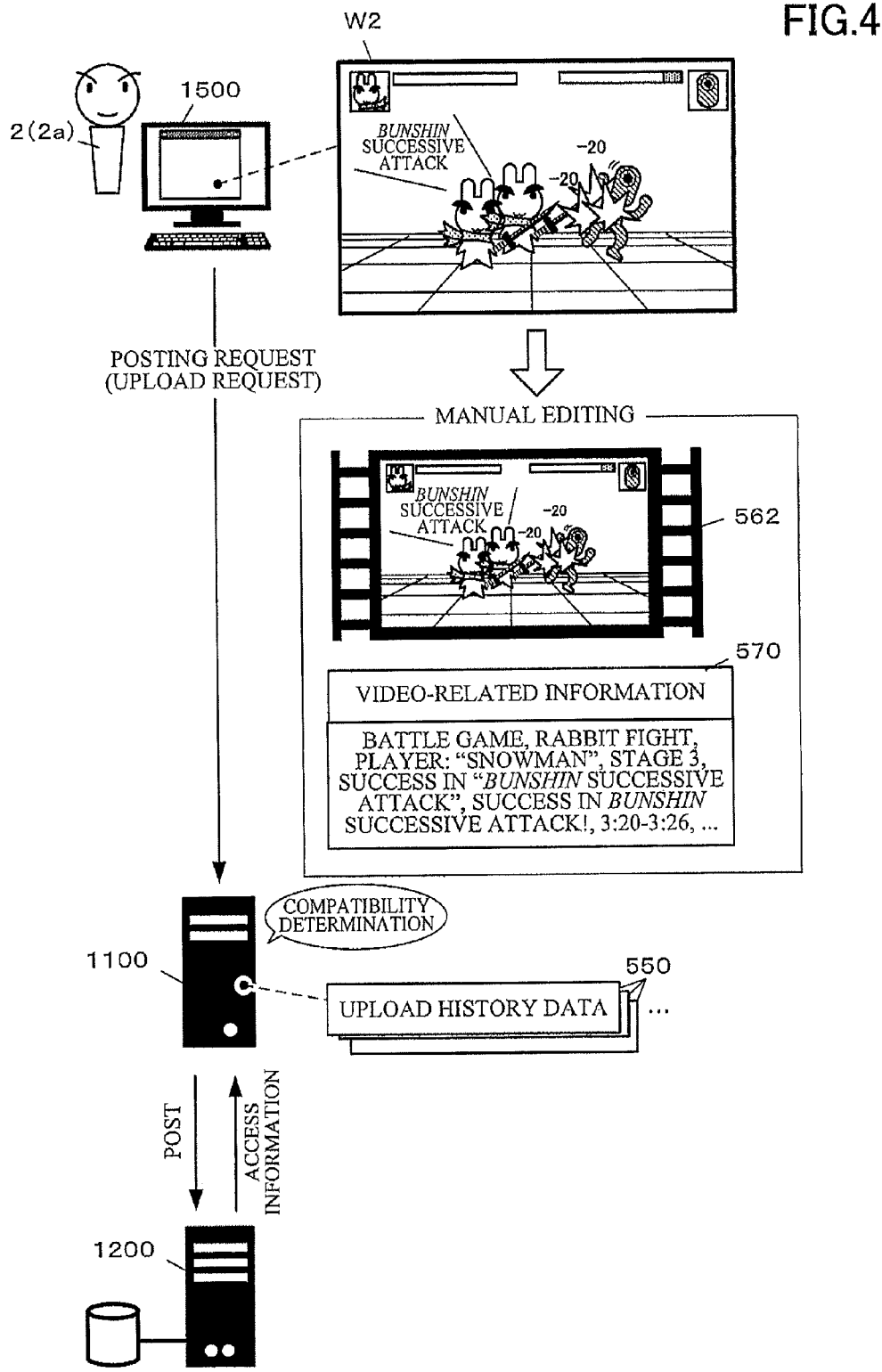
FIG. 4 is a view illustrating a second video posting function (that is implemented by a server system) that uploads (posts) a game play video to a video database.

FIG. 4 is a view illustrating a second video posting function that is implemented by the server system 1100 according to the first embodiment, and posts the game play video to the video database 1200.

The user 2 (player) can access the server system 1100 using the user terminal 1500, and play the online game in the same manner as described above in connection with the first video posting function, but the user terminal 1500 generates the game play video and the video-related information corresponding to an operation input performed by the user 2 (player).

When the user 2 (player) has edited the posting target game play video (upload target video) and the video-related information (upload target video-related information) about the posting target game play video, and performed a given posting request operation using the user terminal 1500, the user terminal 1500 transmits the game play video, the video-related information, and a posting request to the server system 1100.

When the server system 1100 has received the posting request from the user terminal 1500, the server system 1100 determines the compatibility between the contents of the game play video and the contents of the video-related information received from the user terminal 1500 (compatibility determination process), and posts the game play video and the video-related information to the video database 1200 when it has been determined that the contents of the game play video and the contents of the video-related information are compatible with each other. The server system 1100 then acquires the access information from the video database 1200, and generates and stores the upload history data 550.

Figure 5:
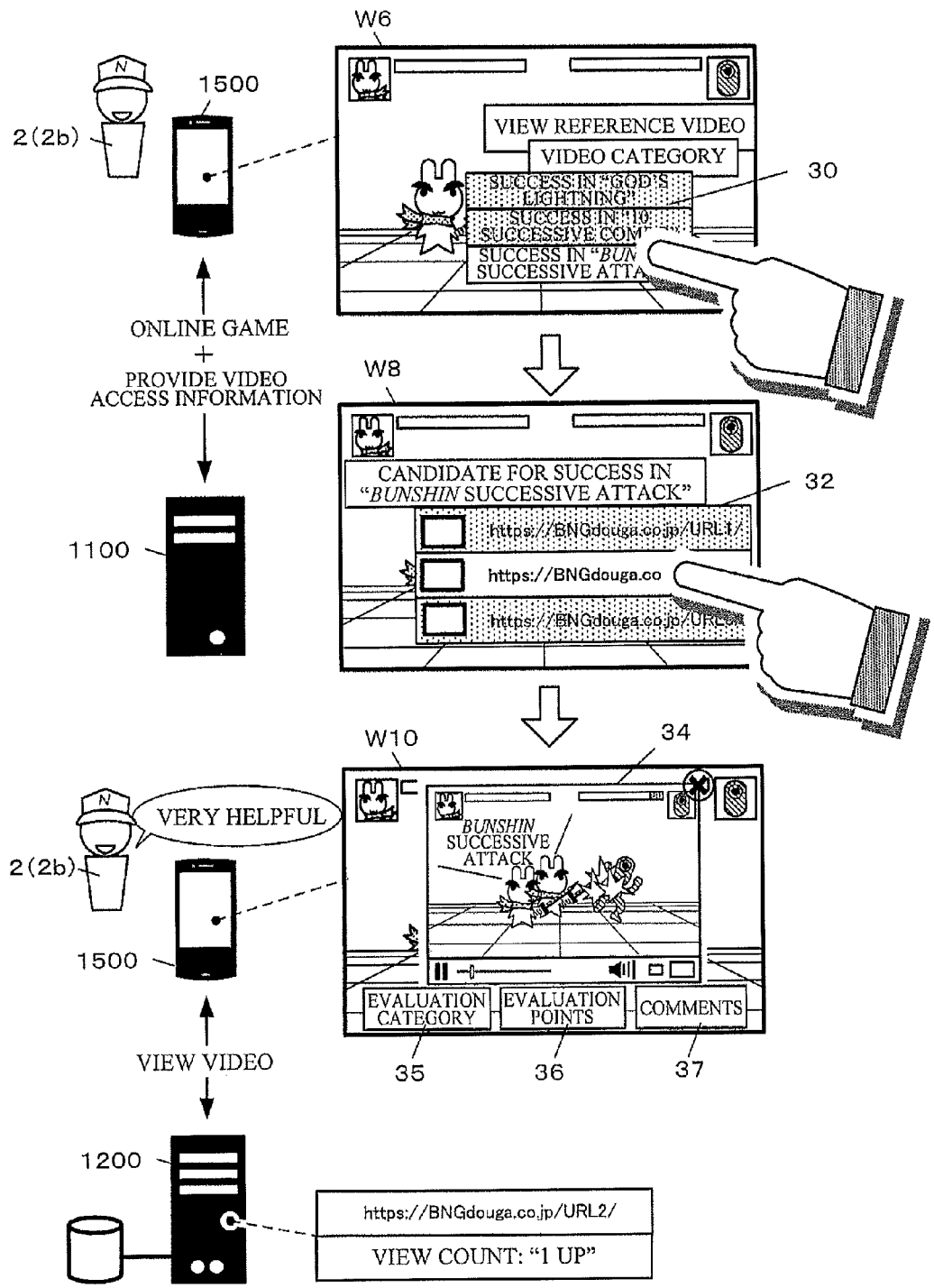
FIG. 5 is a view illustrating a function that provides a player with collected access information about a game play video posted to a video database.

FIG. 5 is a view illustrating the function that provides the player with the access information about the game play video posted to the video database 1200.

The player can query the server system 1100 regarding the access information about the game play video posted to the video database 1200 using the user terminal 1500, and easily view the desired game play video.

More specifically, when the user terminal 1500 has detected a given search request operation input during game play, the user terminal 1500 displays a video category (search keyword) selection menu 30 (see screen example W6).

The video category is the category of the contents of the game play video 562. The categories are provided in advance corresponding to the details of the game. For example, categories "success in technique", "boss character was captured", "trap was avoided", "rare item was found", and the like may be appropriately set.

When an arbitrary video category has been selected from the video category selection menu 30, the user terminal 1500 transmits a search request for the access information about the game play video using the selected video category as the search keyword to the server system 1100.

The server system 1100 performs a search process on the cyclic check result data 640 (see FIG. 2) and the upload history data 550 (see FIGS. 3 and 4) in response to the search request from the user terminal 1500, and returns the access information about the game play video included in the video database 1200 that falls under the video category selected by the player.

When the server system 1100 performs the search process, the server system 1100 refers to the video category selected by the player and the play data (game play information (e.g., current game stage ID, type of enemy character, name of dungeon, position within game space, type of item, and elapsed time from play start) about the game that is played using the user terminal 1500, and searches the video database 1200 for the video-related information that corresponds to the progress of the game (as described in detail later).

The user terminal 1500 displays an access information list 32 that includes the acquired access information (see screen example W8).

When the user 2 (player) has selected arbitrary access information from the access information list 32, the user terminal 1500 accesses the video database 1200 according to the selected access information, and displays the game play video that corresponds to the access information selected using the access information list 32 within a video player screen 34 (see screen example W10). The video database 1200 increments the access counter (view count) of the game play video that has been viewed by the user 2 (player) by "1".

Figure 6:
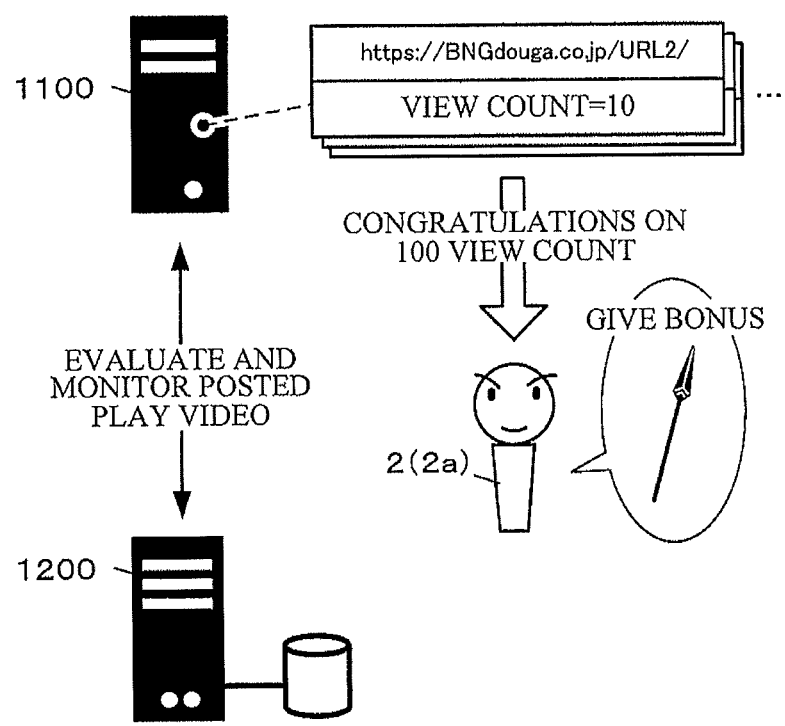
FIG. 6 is a view illustrating a function that gives a bonus to the player who posted a game play video based on the results of access to the game play video posted to a video database.

FIG. 6 is a view illustrating the function that gives the bonus to the user 2 (player) who posted the game play video based on the results of access to the game play video posted to the video database 1200.

The server system 1100 cyclically checks the video database 1200, and evaluates (monitors) the game play video of the online game that is played using the user terminal 1500. In one embodiment of the invention, the server system 1100 checks the results of access (view count) to the previously posted game play video 562 based on the history (upload history data 550) of the previously posted game play video. When the view count satisfies a given bonus-giving condition, the server system 1100 gives the bonus to the user 2 (player) who posted the game play video 562. This makes it possible to motivate the user to more positively upload and share the game play video.

Note that the details of the bonus may be appropriately set. For example, the bonus may be an item, in-game money, an event participation right, a lottery right, or the like that can be used in the online game that is played using the user terminal 1500. When the server system 1100 can provide another game as the online game, the bonus may be an item or the like that can be used in the other game.

The bonus need not necessarily be given to the user based on the view count. When the video database 1200 can deal with comments, the comments that were added by the viewer may be analyzed, and the bonus may be given to the user based on the number of favorable comments.

Figure 7:
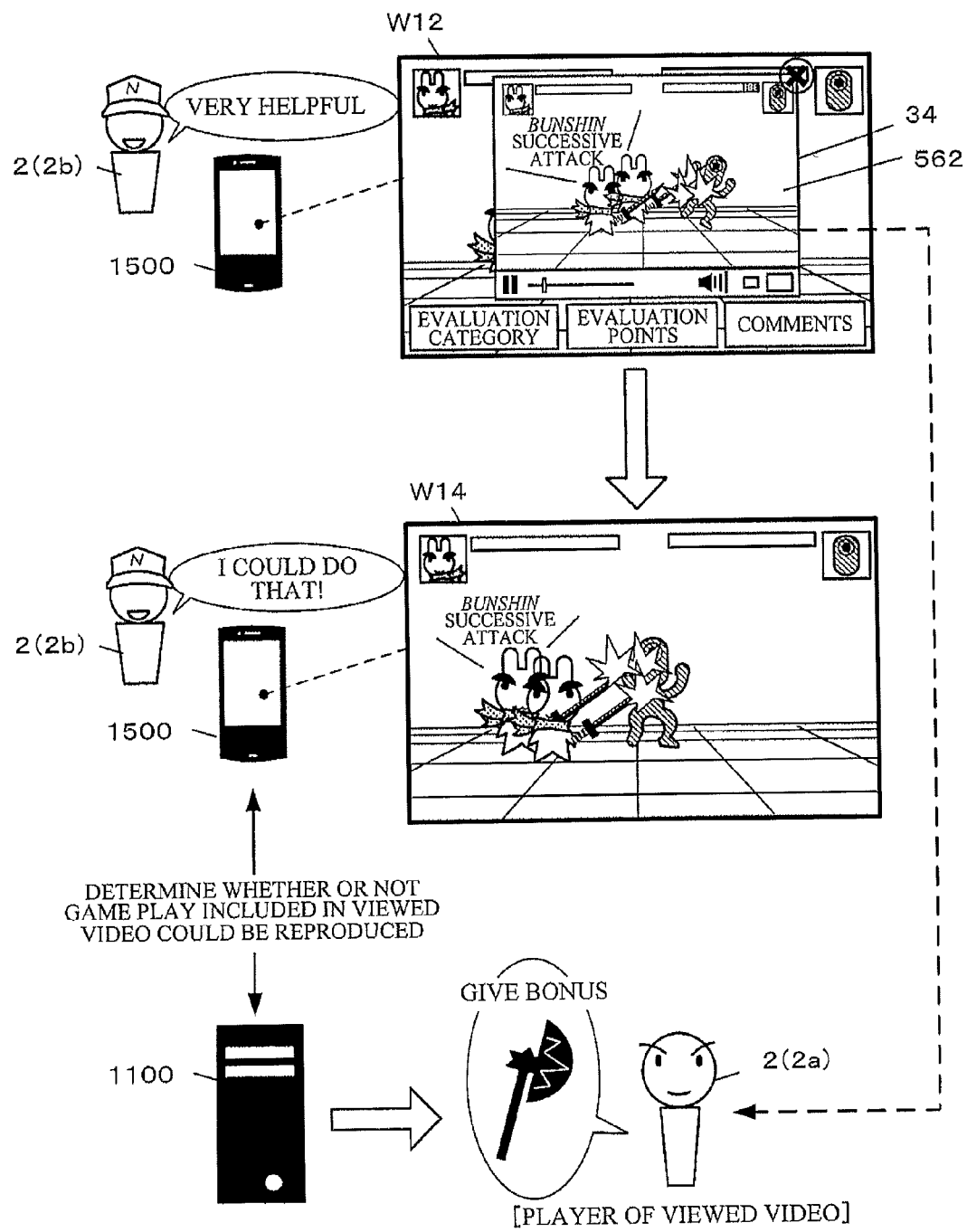
FIG. 7 is a view illustrating a reproduction determination function that determines whether or not game play included in the viewed game play video could be reproduced, and a function that gives a bonus to the player of the game play video corresponding to the determination result.

FIG. 7 is a view illustrating the function that gives the bonus to the player who posted (uploaded) the game play video that was viewed using the user terminal 1500 based on the relationship between the game play video that was viewed using the user terminal 1500 and the result of game play using the user terminal 1500.

The server system 1100 performs a reproduction determination process that determines whether or not the user 2 (2b) (second player) who viewed the game play video 562 posted by the user 2 (2a) (first player) could reproduce the game play in (approximately) the same manner as in the game play video 562 (as described in detail later). The server system 1100 also performs a trial determination process that determines whether or not the user 2 (2b) tried to reproduce the game play (as described in detail later). When the user 2 (2b) could reproduce the game play, or tried to reproduce the game play, the server system 1100 gives the bonus to the user 2 (2a) (first player) who posted the game play video 562 that was viewed by the user 2 (2b) (second player). This makes it possible to further motivate the user to more positively upload and share the game play video.

Functional Configuration

Figure 8:
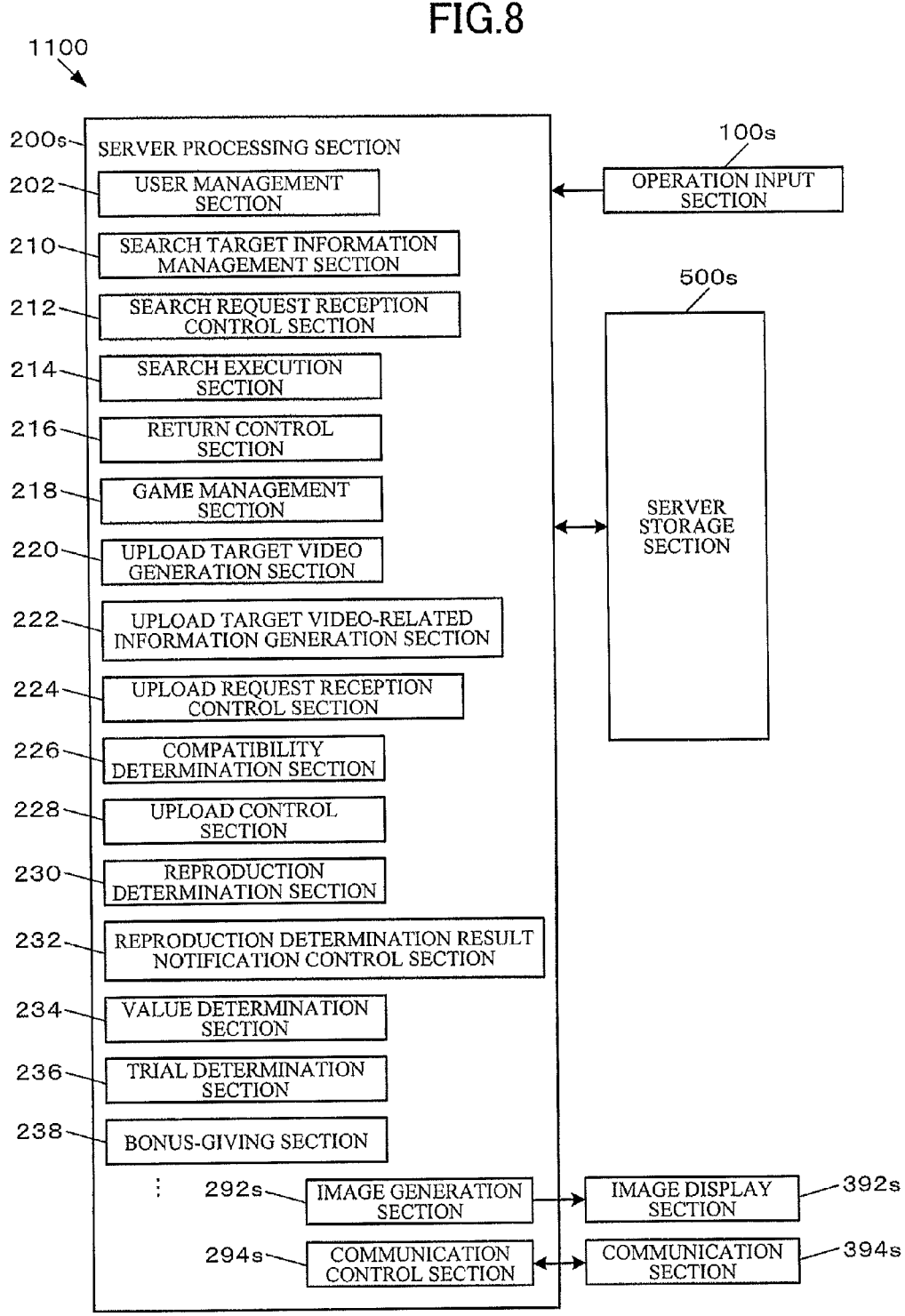
FIG. 8 is a functional block diagram illustrating a functional configuration example of a server system.

FIG. 8 is a functional block diagram illustrating an example of the functional configuration of the server system 1100 according to the first embodiment. The server system 1100 according to the first embodiment includes an operation input section 100s, a server processing section 200s, an image display section 392s, a communication section 394s, and a server storage section 500s.

The operation input section 100s is a means for performing an operation input for managing the server system 1100. A keyboard or the like may be used as the operation input section 100s.

The server processing section 200s is implemented by electronic parts such as a microprocessor (e.g., CPU and GPU) and an IC memory. The server processing section 200s performs a data input-output control process on each functional section (e.g., operation input section 100s and server storage section 500s). The server processing section 200s performs various calculation processes based on a given program, data, an operation input signal from the operation input section 100s, and data received from the user terminal (e.g., user terminal 1500) to control the operation of the server system 1100. In the example illustrated in FIG. 1, the control board 1150 corresponds to the server processing section 200s.

The server processing section 200s according to the first embodiment includes a user management section 202, a search target information management section 210, a search request reception control section 212, a search execution section 214, a return control section 216, a game management section 218, an upload target video generation section 220, an upload target video-related information generation section 222, an upload request reception control section 224, a compatibility determination section 226, an upload control section 228, a reproduction determination section 230, a reproduction determination result notification control section 232, a value determination section 234, a trial determination section 236, a bonus-giving section 238, an image generation section 292s, and a communication control section 294s.

The user management section 202 performs a user registration process, and performs a registration-management process on various types of data that are linked to the registered user. For example, the user management section 202 performs a process that issues a specific user ID to the user who has performed a given registration process. The user management section 202 may also appropriately perform an electronic payment medium link process, an electronic payment account setting process, an account payment process using cash or a credit card, a payment process (e.g., payment of play fee), a payment history storage-management process, and the like. When the game is designed so that the player character can be used in the game by registering the card ID of a game card (trading card), the user management section 202 may also perform a game card registration process.

The search target information management section 210 cyclically checks the video database 1200, acquires the video-related information and the view count of the video stored in (posted (uploaded) to) the video database 1200, and manage the information (search target information) used to search the video database 1200 for the game play video 562 (see FIG. 2). In one embodiment of the invention, the search target information includes the cyclic check result data 640 (see FIG. 15) and the upload history data 550 (see FIG. 9).

The search request reception control section 212 performs a control process that receives the search request for the game play video 562 from the user terminal 1500. In one embodiment of the invention, when the user terminal 1500 that executes the game has detected a given search request operation input, a search condition input screen (i.e., video category selection menu 30 illustrated in FIG. 5) is displayed on the user terminal 1500, and the search request reception control section 212 acquires the result of selection.

The search execution section 214 searches the video database 1200 for the cyclic check result data 640 (see FIG. 2) and the upload history data 550 (see FIGS. 3 and 4) that meet the search request to find the game play video 562 that meets the condition set by the player. The search execution section 214 refers to the play data (game play information) that represents the game that is played using the user terminal 1500 during the search process.

In one embodiment of the invention, the search execution section 214 extracts the cyclic check result data 640 and the upload history data 550 that meet the video category selected using the video category selection menu 30 (see FIG. 5), and then extracts the access information. The search execution section 214 sets a return priority level corresponding to the extracted access information based on the degree of similarity between the video-related information that corresponds to the extracted access information and the play data, and extracts a given number of game play videos to which a higher priority level is assigned to obtain the search results.

The return control section 216 performs a control process that returns the access information about the game play video 562 (posted to the video database 1200) found by the search execution section 214 to the user terminal 1500 that issued the search request. In one embodiment of the invention, the access information is displayed in the access information list 32 (see FIG. 5) so that the desired access information can be selected.

The game management section 218 performs various game play-related processes.

When implementing a client-server online game, the game management section 218 performs a control process that starts the game according to the first embodiment upon reception of an execution request from the user terminal 1500, and provides data necessary for game play to the user terminal 1500 while communicating with the user terminal 1500. Specifically, the game management section 218 performs a game preparation process and a game control process. The game management section 218 stores various types of data necessary for controlling game play in the server storage section 500s as play data 700. When implementing the game in a PvP mode, the game management section 218 may be provided with a player matching function.

The upload target video generation section 220 performs a process that generates and prepares the upload target video (i.e., the game play video to be uploaded) based on the game play performed using the user terminal 1500.

The upload target video-related information generation section 222 performs a process that generates and prepares upload target video-related information that is linked to the upload target video.

The upload request reception control section 224 performs a control process that receives a posting request (upload request) that designates the upload target game play video (upload target video) and the video-related information (upload target video-related information) linked to the upload target video from the user terminal 1500 (see FIG. 4).

The compatibility determination section 226 determines whether or not the upload target video and the upload target video-related information satisfy a given compatibility condition (see FIG. 4).

The upload control section 228 performs a control process that uploads (posts) the automatically generated game play video and the video-related information about the game play video as well as the upload target video and the upload target video-related information that have been determined to satisfy the given compatibility condition by the compatibility determination section 226 to the video database 1200. The upload control section 228 also performs a control process that generates and stores the upload history data 550.

The reproduction determination section 230 determines whether or not the game play performed using the user terminal 1500 satisfies a given reproduction condition (i.e., whether or not the game has been reproduced (approximately) in the same manner as in the game play video) referring to the video-related information linked to the game play video after the return control section 216 has returned the search results to the user terminal 1500.

The reproduction determination result notification control section 232 performs a control process that notifies the user terminal 1500 that the game play performed using the user terminal 1500 satisfies the given reproduction condition when the reproduction determination section 230 has determined that the game play performed using the user terminal 1500 satisfies the given reproduction condition.

The value determination section 234 determines whether or not the game play performed using the user terminal 1500 satisfies a given value condition (i.e., whether or not the play result of the game play performed using the user terminal 1500 was identical to, or better than, that of the game play video) referring to the video-related information linked to the game play video after the return control section 216 has returned the search results to the user terminal 1500.

The trial determination section 236 determines whether or not the game play performed using the user terminal 1500 satisfies a given trial condition (i.e., whether or not the game play performed using the user terminal 1500 was in line with the game play video) referring to the video-related information linked to the game play video after the return control section 216 has returned the search results to the user terminal 1500.

The bonus-giving section 238 performs a control process that gives the bonus that corresponds to the evaluation state of the game play video to the player who posted the game play video to the video database 1200. In one embodiment of the invention, the bonus-giving section 238 performs the following first to fifth bonus-giving processes.

1) When the view count of the game play video uploaded under control of the upload control section 228 has satisfied a given bonus-giving condition, the bonus-giving section 238 gives a given bonus to the user who uploaded the game play video (uploader (i.e., the player of the game play video)) (first bonus-giving process).

2) When the reproduction determination section 230 has determined that the game play performed using the user terminal 1500 satisfies the given reproduction condition, and the game play video is a video uploaded under control of the upload control section 228, the bonus-giving section 238 gives a given bonus to the user who uploaded the game play video (uploader (i.e., the player of the game play video)) (second bonus-giving process).

3) When the value determination section 234 has determined that the game play performed using the user terminal 1500 satisfies the given value condition, and the game play video is a video uploaded under control of the upload control section 228, the bonus-giving section 238 gives a given bonus to the user who uploaded the game play video (uploader (i.e., the player of the game play video)) (third bonus-giving process).

4) When the trial determination section 236 has determined that the game play performed using the user terminal 1500 satisfies the given trial condition, and the game play video is a video uploaded under control of the upload control section 228, the bonus-giving section 238 gives a given bonus to the user who uploaded the game play video (uploader (i.e., the player of the game play video)) (fourth bonus-giving process).

5) When the cumulative evaluation results for the game play video uploaded under control of the upload control section 228 have satisfied a given bonus-giving condition, the bonus-giving section 238 gives a given bonus to the user who uploaded the game play video (uploader (i.e., the player of the game play video)) (fifth bonus-giving process).

The image generation section 292s is implemented by a processor (e.g., GPU and digital signal processor (DSP)), a video signal IC, a program (e.g., video codec), a drawing frame IC memory (e.g., frame buffer), or the like. The image generation section 292s generates data for displaying the game screen (image) on the user terminal 1500 based on the processing results of the game management section 218. The image generation section 292s generates an image necessary for the system management process, and outputs the resulting image signal to the image display section 392s.

The image display section 392s displays various images necessary for the system management process based on the image signal input from the image generation section 292s. The image display section 392s may be implemented by an image display device such as a flat panel display, a cathode-ray tube (CRT), a projector, or a head-mounted display.

The communication control section 294s performs a data communication process, and exchanges data with an external device through the communication section 394s.

The communication section 394s connects to the communication line 9 to implement communication. The communication section 394s is implemented by a transceiver, a modem, a terminal adapter (TA), a jack for a communication cable, a control circuit, and the like. In the example illustrated in FIG. 1, the communication device 1153 corresponds to the communication section 394s.

The server storage section 500s stores a system program that causes the server processing section 200s to control the server system 1100, a game management program, various types of data, and the like. The server storage section 500s is used as a work area for the server processing section 200s, and temporarily stores the results of calculations performed by the server processing section 200s according to various programs. The function of the server storage section 500s is implemented by an IC memory (e.g., RAM and ROM), a magnetic disk (e.g., hard disk), an optical disk (e.g., CD-ROM and DVD), an online storage, or the like. In the example illustrated in FIG. 1, the storage medium (e.g., IC memory 1152 and hard disk) corresponds to the server storage section 500s.

Figure 9:
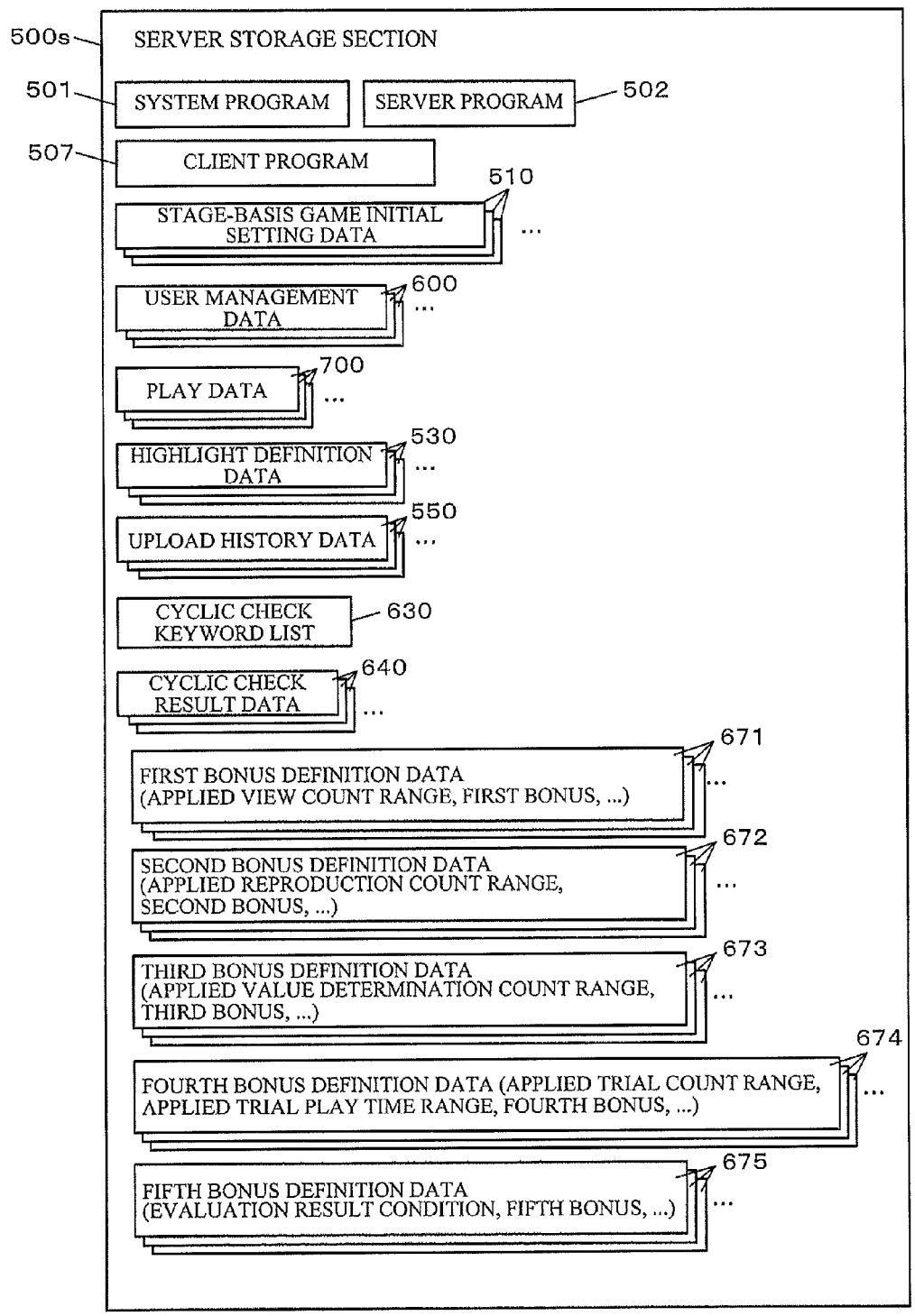
FIG. 9 is a view illustrating an example of a program and data that are stored in a server storage section.

FIG. 9 is a view illustrating an example of a program and data stored in the server storage section 500s according to the first embodiment.

The server storage section 500s stores a system program 501, a server program 502, a client program 507, stage-basis game initial setting data 510, highlight definition data 530, the cyclic check keyword list 630, first bonus definition data 671, second bonus definition data 672, third bonus definition data 673, fourth bonus definition data 674, and fifth bonus definition data 675.

The server storage section 500s also stores user management data 600, the play data 700, the upload history data 550, and the cyclic check result data 640 that are successively generated and updated. The server storage section 500s may also appropriately store additional information (e.g., timer value, counter value, and flag).

The system program 501 is a basic program that is read and executed by the server processing section 200s to implement a basic input-output function necessary for a computer.

The server program 502 is a program that causes the server processing section 200s to implement the functions of the user management section 202, the search target information management section 210, the search request reception control section 212, the search execution section 214, the return control section 216, the game management section 218, the upload target video generation section 220, the upload target video-related information generation section 222, the upload request reception control section 224, the compatibility determination section 226, the upload control section 228, the reproduction determination section 230, the reproduction determination result notification control section 232, the value determination section 234, the trial determination section 236, and the bonus-giving section 238.

The client program 507 is a program that is executed by the user terminal 1500 to execute the game. The client program 507 may be implemented by a dedicated program, for example. When implementing the game according to the first embodiment as a web game, the client program 507 may be implemented using web technology that actively controls the screen display based on a web browser utilizing HTML, Java (registered trademark), Cascading Style Sheets (CSS), and the like, and a plug-in such as Adobe (registered trademark) Flash. Note that another method may also be used.

The stage-basis game initial setting data 510 is provided on a game stage basis, and includes various types of initial setting data necessary for executing the game that corresponds to each stage. Part of the stage-basis game initial setting data 510 may be distributed to the user terminal 1500.

Figure 10:
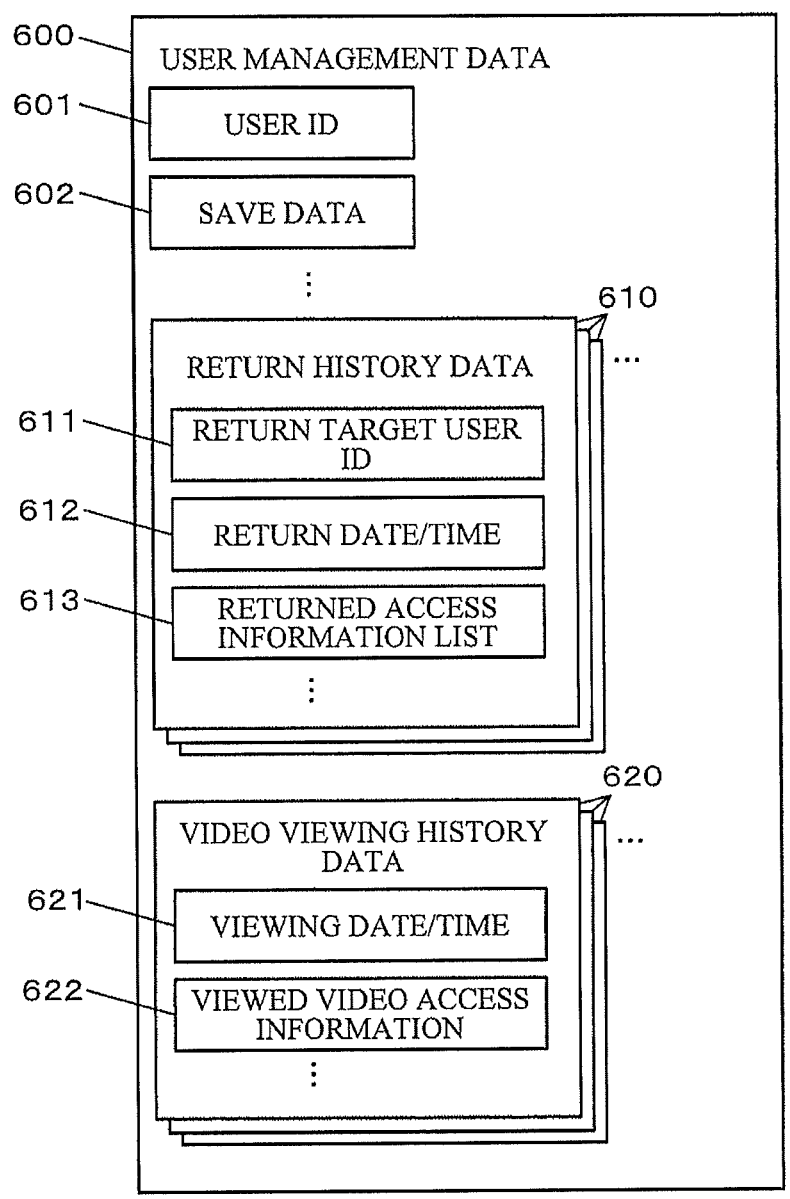
FIG. 10 is a view illustrating a data configuration example of user management data.

The user management data 600 is provided corresponding to each user registered as a player of the online game provided by the server system 1100. As illustrated in FIG. 10, the user management data 600 includes a user ID 601, save data 602 that includes data that represents the progress of the game up to the latest play, return history data 610, and video viewing history data 620, for example. Note that the user management data 600 may appropriately include additional data.

The return history data 610 is generated corresponding to the history of each return to the game play video search request from the user terminal 1500 operated by the user. The return history data 610 includes a return target user ID 611 (that is identical to the user ID 601), a return date/time 612, and a returned access information list 613 that includes the access information that was transmitted as the search results in order of the priority level. Note that the return history data 610 may appropriately include additional data. For example, the return history data 610 may include identification information for referring to the cyclic check result data 640 and the upload history data 550 that correspond to the access information so that the identification information is linked to each access information included in the returned access information list 613.

The video viewing history data 620 is generated corresponding to each game play video that was viewed. For example, the video viewing history data 620 includes a viewing date/time 621 and viewed video access information 622. Note that the video viewing history data 620 may appropriately include additional data.

Again referring to FIG. 9, the play data 700 is provided corresponding to the game that is being played, and includes various types of data that represent the progress of the game.

Figure 11:
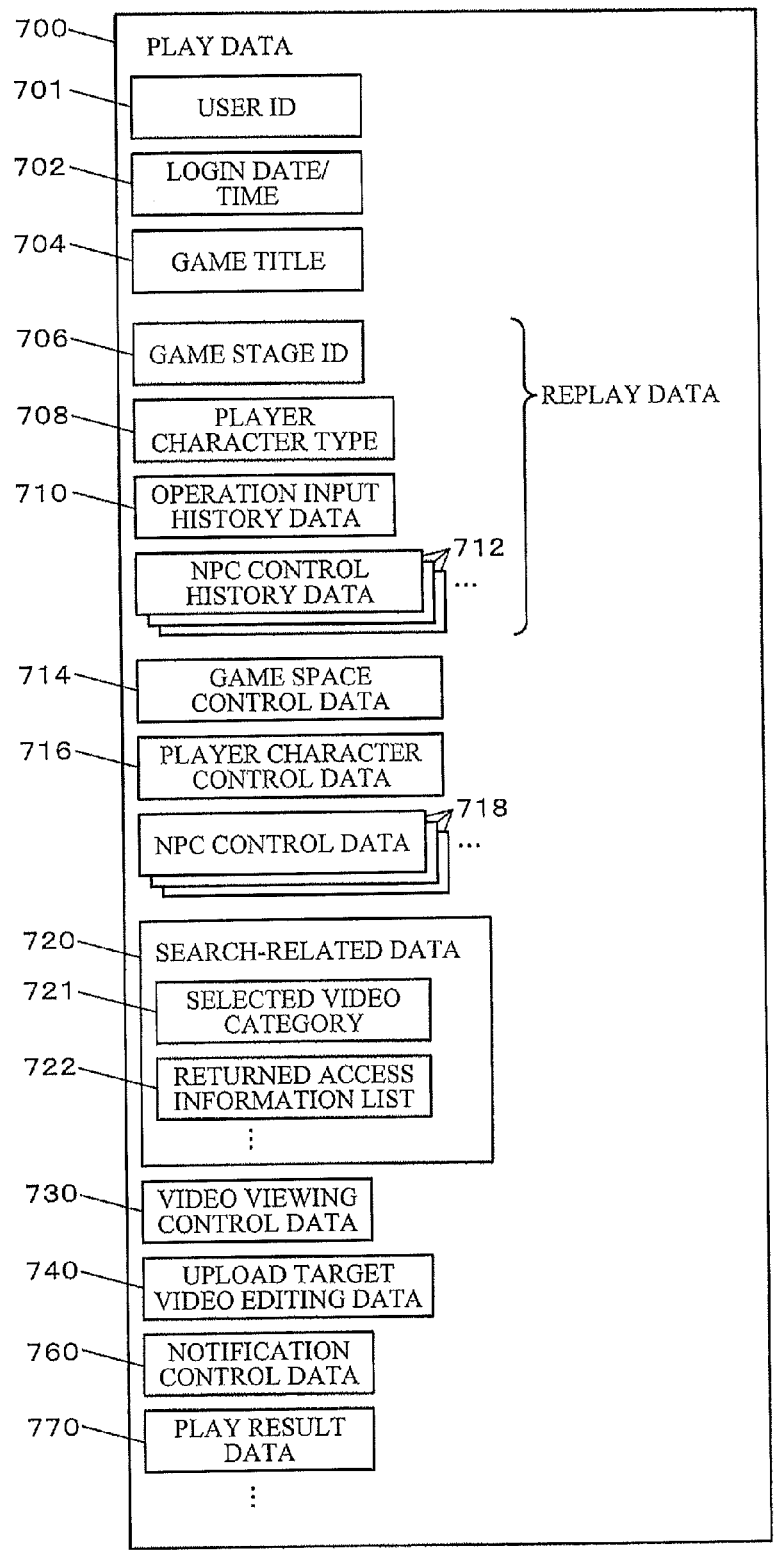
FIG. 11 is a view showing a data configuration example of play data.

As illustrated in FIG. 11, the play data 700 includes a user ID 701 that represents the player, a login date/time 702, a game title 704, a game stage ID 706 that represents the game stage, and a player character type 708 that represents the type of character used as the player character, for example.

The play data 700 also includes operation input history data 710 that represents information about the operation inputs performed by the player in time series, NPC control history data 712 that represents control information in time series corresponding to each NPC that is automatically controlled by the computer, game space control data 714, player character control data 716, and NPC control data 718.

When the replay data refers to data for reconstructing the game play that has been performed, the game stage ID 706, the player character type 708, the operation input history data 710, and the NPC control history data 712 correspond to the replay data.

The play data 700 also includes search-related data 720, video viewing control data 730, upload target video editing data 740, notification control data 760 that includes data for controlling the display of various notifications within the game screen, and play result data 770. Note that the play data 700 may appropriately include additional data.

The search-related data 720 is generated each time the game play video is searched, and includes information about the latest search request. For example, the search-related data 720 includes a selected video category 721 that represents the result of selection using the video category selection menu 30 (see FIG. 5), and a returned access information list 722 that represents the access information returned in response to the search request.

The video viewing control data 730 includes data necessary for replaying or viewing the game play video during game play. In one embodiment of the invention, the video viewing control data 730 includes data necessary for controlling the display of the video player screen 34 (see FIG. 5).

The upload target video editing data 740 includes various types of information about the posting target game play video editing process performed by the player.

Figure 12:
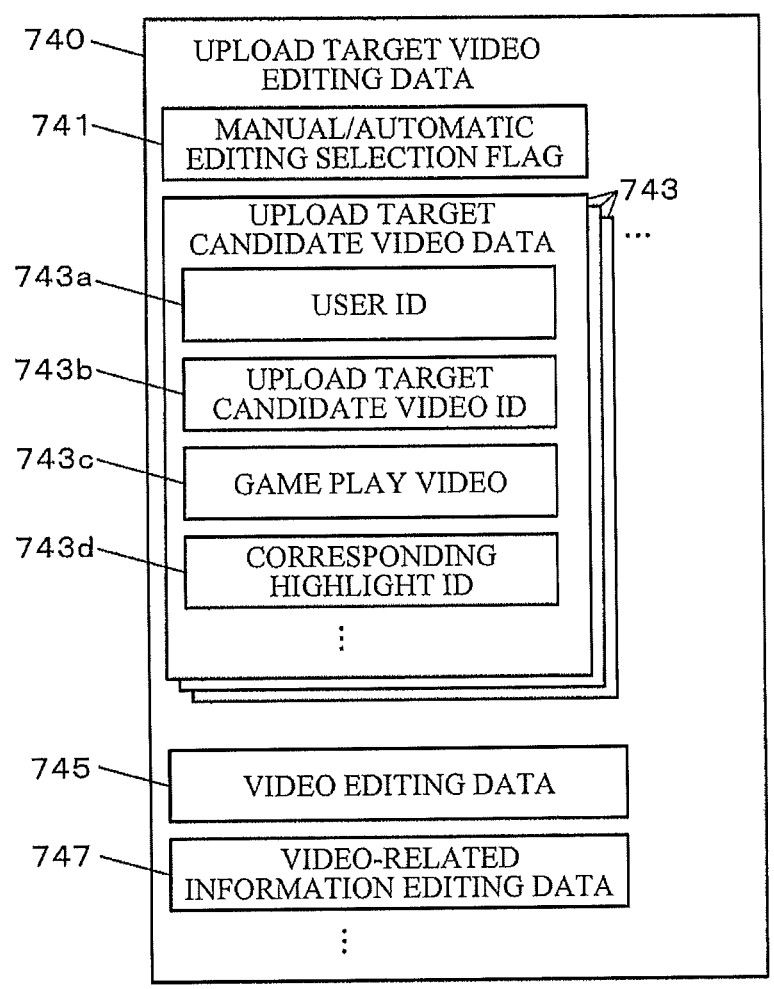
FIG. 12 is a view illustrating a data configuration example of upload target video editing data.

As illustrated in FIG. 12, the upload target video editing data 740 includes a manual/automatic editing selection flag 741 that represents the result of selection by the player as to whether to cause the server system 1100 to automatically edit the upload target video, or manually edit the upload target video, upload target candidate video data 743 that is generated corresponding to each upload target candidate video, video editing data 745 that includes data relating to the manual editing process performed by the player, and upload target video-related information editing data 747 that includes various types of information about the upload target video-related information editing process during the posting target game play video editing process performed by the player. Note that the upload target video editing data 740 may appropriately include additional data.

The upload target candidate video data 743 is game play video data generated by reconstruction from the replay data (e.g., game stage ID 706 to NPC control history data 712 illustrated in FIG. 11) corresponding to each scene that corresponds to the highlight definition data 530 (see FIG. 13) (described later). The upload target candidate video data 743 is a material (candidate) for the uploaded target game play video (play target video).

The upload target candidate video data 743 includes a user ID 743a, a specific upload target candidate video ID 743b, a game play video 743c that includes the images and the sound of the upload target candidate video, and a corresponding highlight ID 743d that represents the highlight definition data 530 that corresponds to the upload target candidate video. Note that the upload target candidate video data 743 may appropriately include additional data.

When the server system 1100 has automatically edited the game play video, the upload target candidate video data 743 is automatically generated, and presented to the player. When the player has selected the desired upload target candidate video data 743, the video data represented by the selected upload target candidate video data 743 is determined to be the play target video, and posted (uploaded) to the video database 1200.

Again referring to FIG. 9, the highlight definition data 530 defines the highlight scene during game play that is determined to be appropriate for posting the game play video. The highlight definition data 530 is provided corresponding to each highlight scene (highlight play state). The highlight definition data 530 also serves as reproduction determination reference data for determining whether or not the game play included in the game play video could be reproduced. The highlight definition data 530 further serves as trial determination reference data for determining whether or not the player tried to reproduce the game play included in the game play video.

The highlight scene can be appropriately set taking account of the details of the game. Examples of the highlight scene include "stage clear", "five successive combo", "use of killer shot A", "success in shooting over 1000 m", "discovery of new path for avoiding trap", "appearance of concealed door", and the like.

Figure 13:
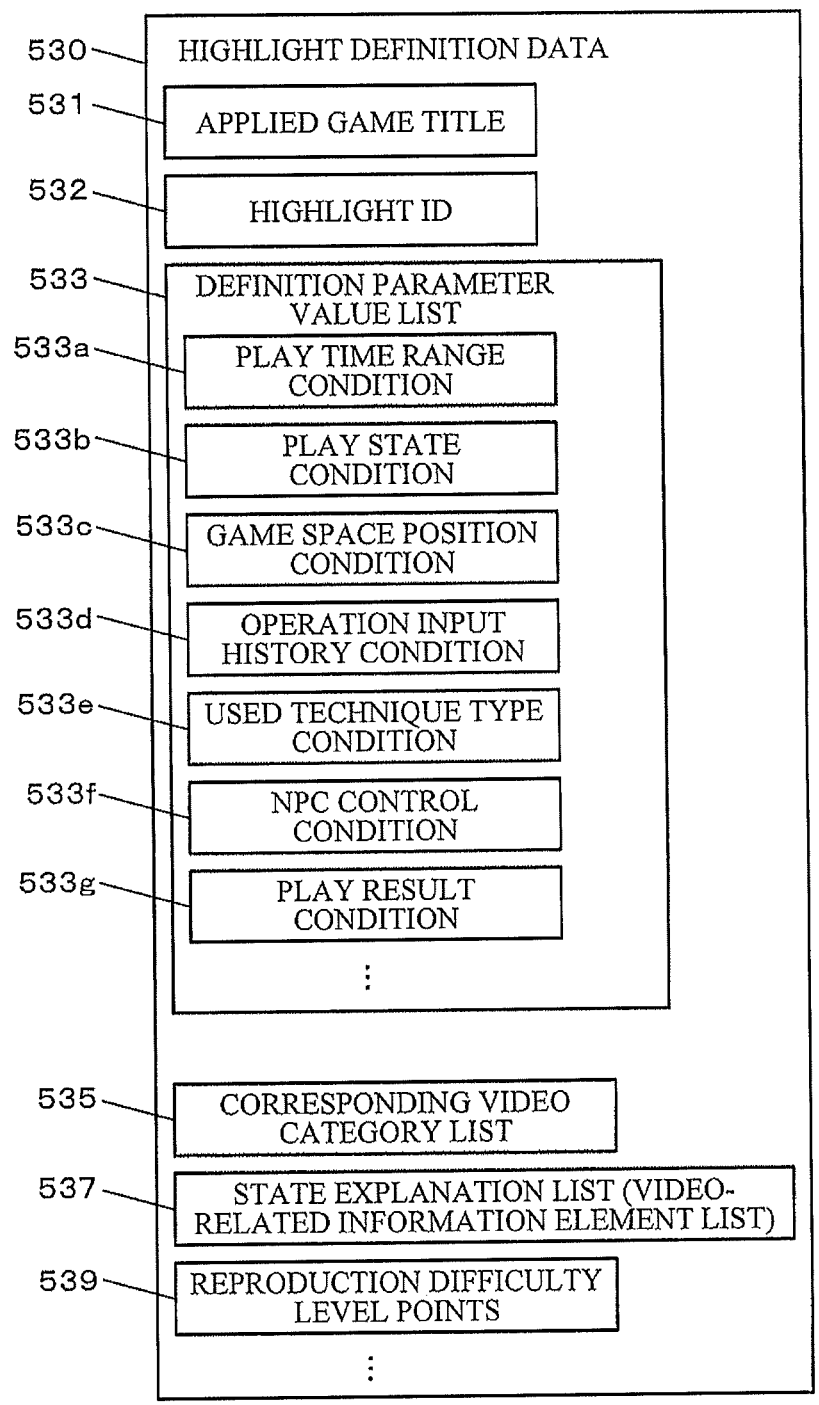
FIG. 13 is a view illustrating a data configuration example of highlight definition data.

As illustrated in FIG. 13, the highlight definition data 530 includes an applied game title 531 that represents the game to which the highlight scene is applied, a specific highlight ID 532, a definition parameter value list 533, a corresponding video category list 535, a state explanation list 537, and reproduction difficulty level points 539. Note that the highlight definition data 530 may appropriately include additional data.

The definition parameter value list 533 includes highlight scene definition data that uses a parameter value that describes the control of the progress of the game.

For example, the definition parameter value list 533 includes 1) a play time range condition 533a that limits the range of the elapsed time from the start of game play, 2) a play state condition 533b that limits the play state (e.g., game stage, scenario, and play mode), 3) game space position information 533c that limits the range of the position of the player character corresponding to each game stage, 4) an operation input history condition 533d that limits the operation input pattern of the player, 5) a used technique type condition 533e that limits the type of technique that has been used, 6) an NPC control condition 533f that limits the state, the type, the number, and the like of NPC, and 7) a play result condition 533g that limits the play result. The highlight scene is defined using one parameter value or a plurality of parameter values among these parameter values.

The corresponding video category list 535 is a list of video categories that correspond to the highlight scene. The video category is defined in the same manner as the type of highlight scene. Examples of the video category include "stage clear", "five successive combo", "use of killer shot A", "success in shooting over 1000 m", "discovery of new path for avoiding trap", "appearance of concealed door", and the like.

The state explanation list 537 is a list of options that represent the state explanation text and the state explanation sound suitable for the highlight scene, and the state that corresponds to the highlight scene.

The reproduction difficulty level points 539 are a numerical value that represents the highlight scene reproduction difficulty level. The reproduction difficulty level points 539 are appropriately set by the game producer.

Again referring to FIG. 9, the upload history data 550 is generated each time the game play video is uploaded.

Figure 14:
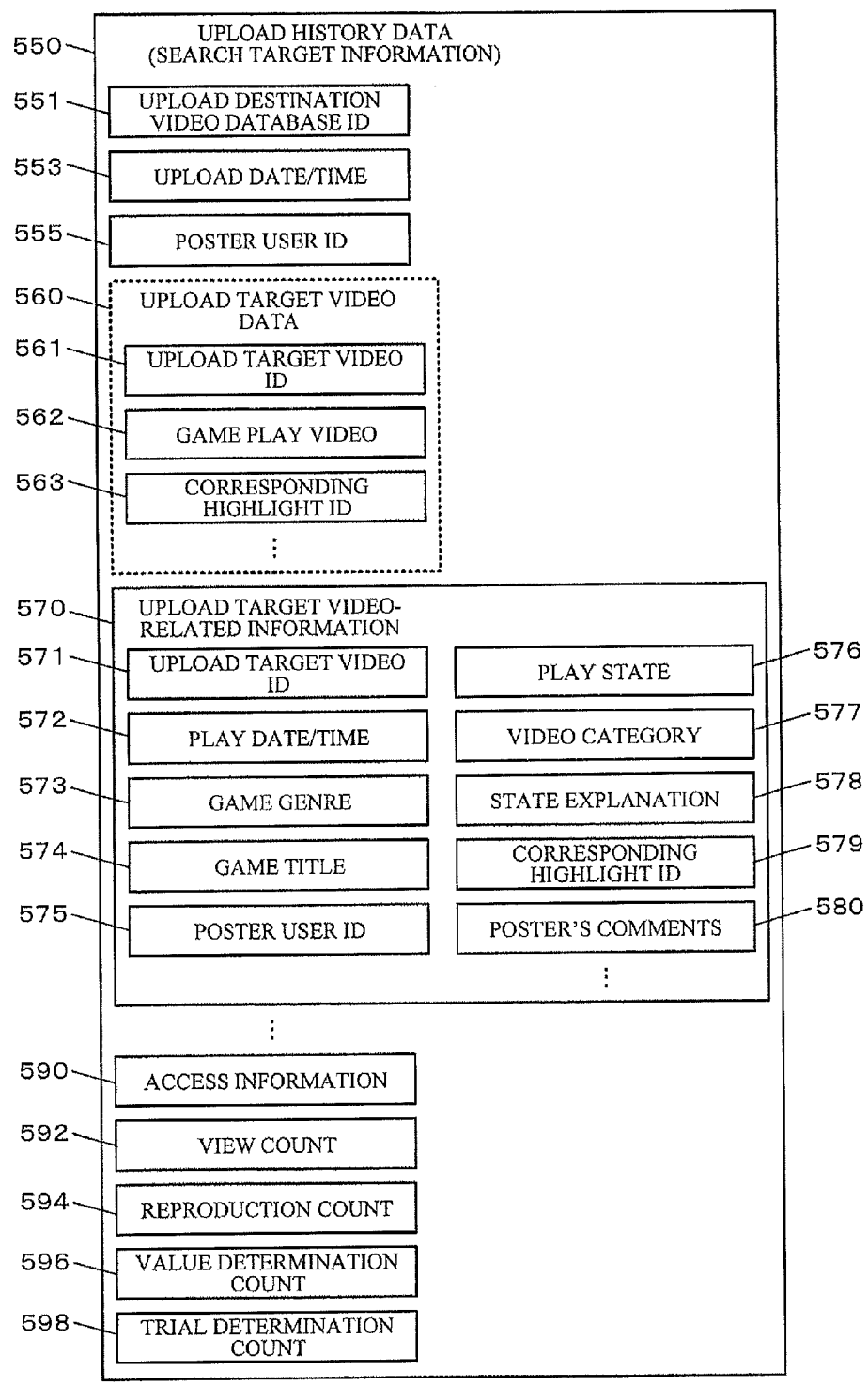
FIG. 14 is a view illustrating a data configuration example of upload history data.

As illustrated in FIG. 14, the upload history data 550 includes an upload destination video database ID 551, an upload date/time 553, a poster user ID 555, upload target video data 560, upload target video-related information 570, access information 590, a view count 592, a reproduction count 594, a value determination count 596, and a trial determination count 598, for example. Note that the upload history data 550 may appropriately include additional data.

The poster user ID 555 is the user ID of the player (user) who uploaded the game play video (user ID 701 included in play data 700 (see FIG. 11)).

The upload target video data 560 includes a specific upload target video ID 561, an uploaded game play video 562, and a corresponding highlight ID 563 that is the highlight ID 532 of the corresponding highlight definition data 530, for example.

The upload target video-related information 570 includes an upload target video ID 571 that represents the upload target video that corresponds to the upload target video-related information, a play date/time 572, a game genre 573, a game title 574, a poster user ID 575, a play state 576, a video category 577, a state explanation 578, a corresponding highlight ID 579, and a poster's comments 580. Note that the upload target video-related information 570 may appropriately include additional data.

The access information 590 represents the access information that was assigned by the video database 1200 when the game play video was uploaded, and returned from the video database 1200.

The view count 592 represents the view count of the uploaded game play video.

The reproduction count 594 represents the cumulative number of times that the game play included in the uploaded game play video was determined to be reproduced by another player. The initial value of the reproduction count 594 is set to "0".

The value determination count 596 represents the number of times that the uploaded game play video was determined to be valuable for another player. The initial value of the value determination count 596 is set to "0".

The trial determination count 598 represents the number of times that the game play included in the uploaded game play video was determined to be tried by another player. The initial value of the trial determination count 598 is set to "0".

Again referring to FIG. 9, the cyclic check keyword list 630 includes information about the search keyword for extracting the game play video of the online game provided by the server system 1100 from the videos posted to the video database 1200. The cyclic check keyword is appropriately set taking account of the details of the game (e.g., game genre, game title, game stage, name of scenario, name of technique or magic used by player character, name of item, name of weapon, name of summoned beast, name of boss character, or name of place within game space).

The cyclic check result data 640 includes information about each game play video of the online game provided by the server system 1100 that has been posted to the video database 1200 and found by cyclically checking the video database 1200.

Figure 15:
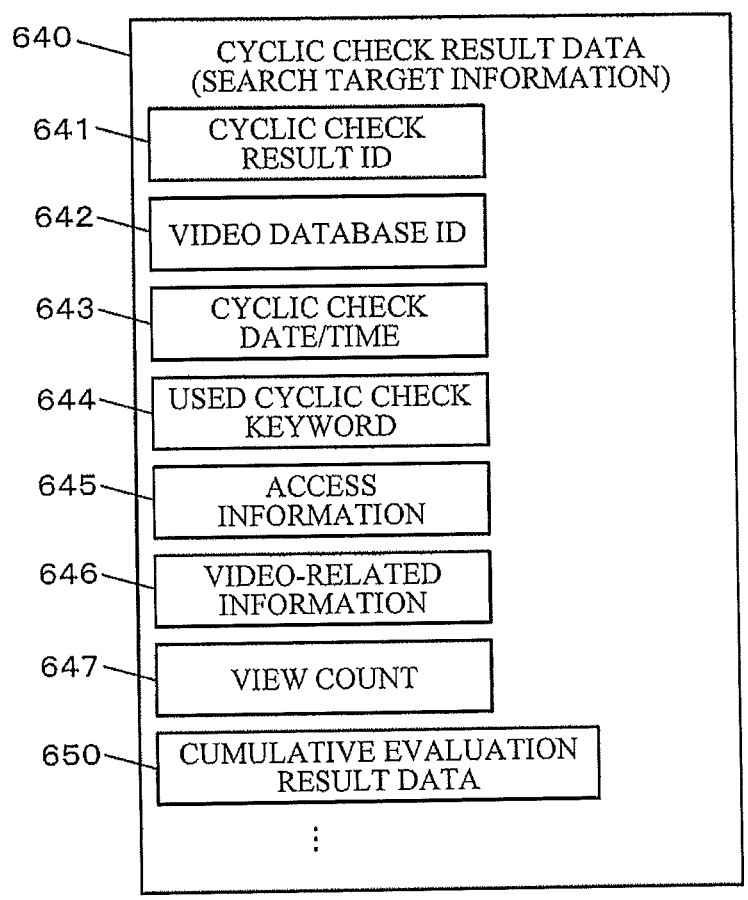
FIG. 15 is a view illustrating a data configuration example of cyclic check result data.

As illustrated in FIG. 15, the cyclic check result data 640 includes a specific cyclic check result ID 641, a video database ID 642 that represents the cyclic check target video database, the cyclic check date/time 643, the used cyclic check keyword 644 that represents the cyclic check keyword used to obtain the cyclic check result, the access information 645 for accessing the game play video that was found, the video-related information 646, the view count 647, and the cumulative evaluation result data 650, for example. Note that the cyclic check result data 640 may appropriately include additional data.

Again referring to FIG. 9, the first bonus definition data 671 defines the first bonus that is given to player of the game play video (i.e., the player who posted the game play video) corresponding to the view count of the game play video posted by the server system 1100, and is provided corresponding to the first bonus. The first bonus definition data 671 includes an applied view count range (i.e., the range of the view count) and the first bonus in a linked manner, for example.

The second bonus definition data 672 defines the second bonus that is given to the player of the game play video (i.e., the player who posted the game play video) when the game play included in the game play video posted by the server system 1100 was reproduced by another player, and is provided corresponding to the second bonus. The second bonus definition data 672 includes a reproduction count range (i.e., the range of the reproduction count) and the second bonus in a linked manner, for example.

The third bonus definition data 673 defines the third bonus that is given to the player of the game play video (i.e., the player who posted the game play video) when the game play included in the game play video posted by the server system 1100 was determined to be valuable for another player, and is provided corresponding to the third bonus. The third bonus definition data 673 includes an applied value determination count range (i.e., the range of the value determination count) and the third bonus in a linked manner, for example.

The fourth bonus definition data 674 defines the fourth bonus that is given to the player of the game play video (i.e., the player who posted the game play video) when the game play included in the game play video posted by the server system 1100 was tried by another player, and is provided corresponding to the fourth bonus. The fourth bonus definition data 674 includes an applied trial determination count range (i.e., the range of the trial determination count), an applied trial play time range (i.e., the range of the play time required for trial (trial play time)), and the fourth bonus in a linked manner, for example.

The fifth bonus definition data 675 defines the fifth bonus that is given to the player of the game play video (i.e., the player who posted the game play video) corresponding to the cumulative evaluation results by the viewers for the game play video posted by the server system 1100, and is provided corresponding to the fifth bonus. The fifth bonus definition data 675 includes an evaluation result condition (e.g., the number of praise operations performed by the viewers, a combination of the type and the number of praise operations, the ranges of the number of comments added by the viewers, and the range of the number of comments that use a given term), and the fifth bonus in a linked manner, for example.

Operation

The operation of the server system 1100 is described below.

Figure 16:
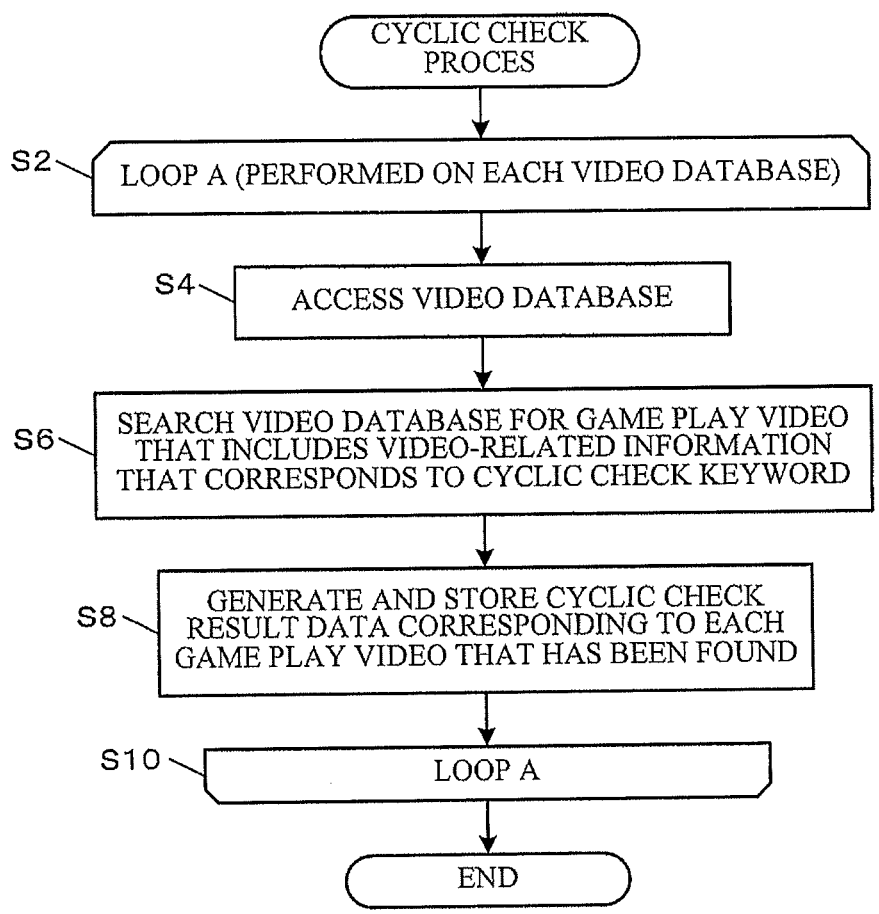
FIG. 16 is a flowchart illustrating the flow of a cyclic check process that is performed by a server system either periodically or intermittently.

FIG. 16 is a flowchart illustrating the flow of a cyclic check process that is performed by the server system 1100 either periodically or intermittently. The flow of the cyclic check process described below is implemented by causing the server system 1100 to execute the server program 502.

The term "cyclic check process" used herein refers to a process that collects the access information about the game play video of the online game provided by the server system 1100 that has been posted to the video database 1200, and regularly monitors the results of evaluation by the viewers.

The server system 1100 performs a loop A process corresponding to each video database 1200 selected in advance (steps S2 to S10). The loop A process includes accessing the processing target video database 1200 (step S4), searching the video database 1200 for the game play video that includes the video-related information 403 that includes the cyclic check keyword included in the cyclic check keyword list 630 (see FIG. 9) (step S6), and generating or updating the cyclic check result data 640 corresponding to each game play video that has been found (step S8).

When the video database 1200 is a video site, the server system 1100 accesses the front page of the video site using known web browsing technology. The server system 1100 jumps to the web page of the game play video that corresponds to the cyclic check keyword using the page description data and the feed information obtained by reading the page.

When the cyclic check result data 640 about the access information 645 that corresponds to the jump destination page is absent, the server system 1100 generates new cyclic check result data 640. The server system 1100 sets the access information (e.g., URL) about the jump destination page to the access information 645, and sets the video-related information 646, the view count 647, and the cumulative evaluation result data 650 based on the page description data. The server system 1100 sets the value determination count 658 to "0" (initial value).

When the cyclic check result data 640 about the access information 645 that corresponds to the jump destination page is present, the server system 1100 updates the view count 647 and the cumulative evaluation result data 650 based on the page description data.

When the server system 1100 has jumped from the front page to the page of the target game play video, the server system 1100 searches the site corresponding to each cyclic check keyword using an API provided by the video site, and generates or updates the cyclic check result data 640.

When the server system 1100 has performed the loop A process on all of the video databases 1200 selected in advance, the server system 1100 terminates the cyclic check process.

FIGS. 17 to 20 are flowcharts illustrating the flow of a game management process that is performed by the server system 1100. The flow of the game management process described below is implemented by causing the server system 1100 to execute the server program 502. Note that the following description is given on the assumption that the player has registered himself/herself as a user (i.e., the user management data 600 has been generated (FIG. 10)), and the user terminal 1500 operated by the player has executed the client program 507 to establish data communication with the server system 1100.

The term "game management process" used herein refers to a process in which the server system 1100 causes the user terminal 1500 to execute the online game.

Figure 17:
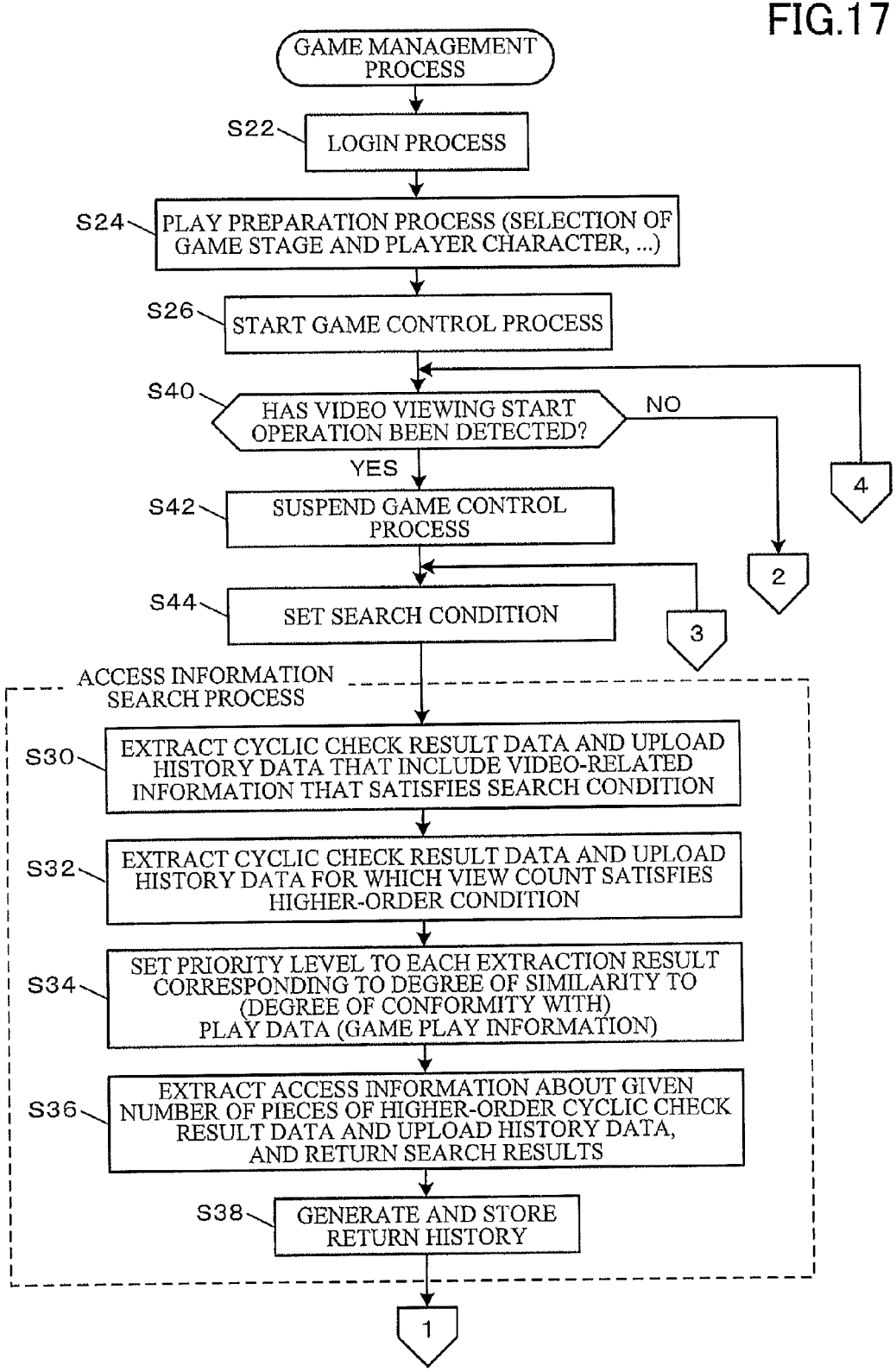
FIG. 17 is a flowchart illustrating the flow of a game management process.

As illustrated in FIG. 17, the server system 1100 performs a login process (step S22), and performs a play preparation process (step S24). The play preparation process includes a process that allocates a storage area for the play data 700, and sets the game stage and the character used as the player character corresponding to a selection operation input performed by the player. When the game title can also be selected, the server system 1100 also performs a selection reception-game title setting process.

The server system 1100 then starts the game control process (step S26).

The operation input history data 710, the NPC control history data 712, the game space control data 714, the player character control data 716, and the NPC control data 718 included in the play data 700 are generated and updated as the game progresses. Specifically, the replay data is accumulated.

When it has been detected that a given video viewing start operation input has been performed using the user terminal 1500 (YES in step S40), the server system 1100 suspends the game control process (step S42), and performs a video category selection reception process in order to set the search condition (step S44).

In one embodiment of the invention, the server system 1100 causes the user terminal 1500 to display the video category selection menu 30 within the game screen (see FIG. 5), and receives the result of selection using the selection menu 30. The server system 1100 may cause the user terminal 1500 to display a screen that allows the player to select the desired cyclic check keyword included in the cyclic check keyword list 630, and receive the result of selection.

The server system 1100 then performs an access information search process based on the result of the search condition selection input (steps S30 to S38).

Specifically, the server system 1100 extracts the cyclic check result data 640 (see FIG. 15) and the upload history data 550 (see FIG. 14) that include the video-related information that satisfies the search condition (step S30), and extracts the cyclic check result data 640 and the upload history data 550 for which the view count satisfies a higher-order condition (e.g., higher-order 30 view counts) (step S32).

The server system 1100 sets the priority level to each extraction result corresponding to the degree of similarity to (degree of conformity with) the current game play state based on the video-related information included in the cyclic check result data 640 and the upload history data 550 (step S34). The server system 1100 extracts the access information about a given number of pieces of higher-order cyclic check result data 640 and upload history data 550, returns the search results, and causes the user terminal 1500 to display the access information list 32 (step S36 (see FIG. 5)). In this case, the access information list 32 is displayed in a state in which the access information is sorted in descending order of the video-related information (e.g., viewer's comments) addition date/time.

The server system 1100 generates new return history data 610 (that is included in the user management data 600) based on the search results that have been currently returned by the server system 1100 (step S38).

Note that the priority level setting method used in the step S34 may be appropriately set. In one embodiment of the invention, various parameter values included in the play data 700 are compared with the definition parameter value list 533 (see FIG. 13) included in the highlight definition data 530 to calculate the degree of similarity (degree of conformity). The degree of similarity is set to "100" when all of the conditions included in the highlight definition data 530 have been satisfied. The degree of similarity is decreased as the number of conditions that have been satisfied decreases. The degree of similarity is set to "0" when all of the conditions have not been satisfied. The degree of similarity is decreased as the difference from the parameter value defined by each condition increases.

Figure 18:
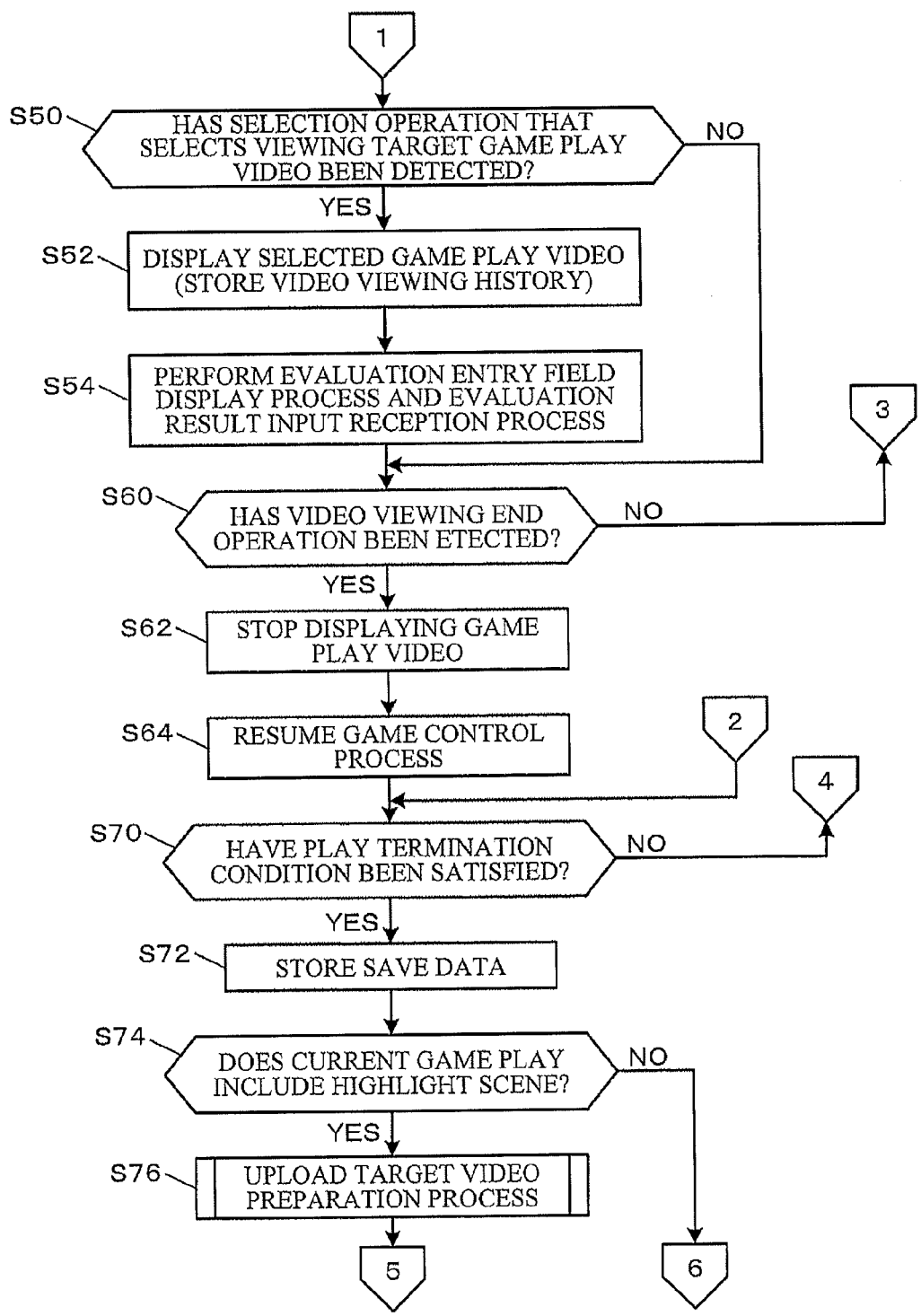
FIG. 18 is a flowchart that follows FIG. 17.

As illustrated in FIG. 18, when the player has selected the desired access information from the access information list 32 using the user terminal 1500, the server system 1100 determines that it has been detected that a selection operation input that selects the viewing target game play video has been performed (YES in step S50). The server system 1100 causes the user terminal 1500 to replay the game play video stored in the video database 1200 based on the access information selected using the video player screen 34 (see FIG. 5), and generates new video viewing history data 620 (that is included in the user management data 600) (step S52 (see FIG. 10)). The server system 1100 then performs an evaluation entry field display process and an evaluation result input reception process (step S54).

In one embodiment of the invention, the evaluation entry field includes an evaluation category selection field 35, an evaluation point entry field 36, and a comment entry field 37.

The evaluation category selection field 35 allows the viewer to input (select) a good point of the game play video. The evaluation category can be appropriately set. For example, "play skill", "poster's comments", "unpredictable quality", and the like may be set as the evaluation category.

The evaluation point entry field 36 allows the viewer to input the evaluation points (e.g., 0 to 100).

Various evaluation entry fields may be used corresponding to the specification of the video database 1200. For example, some of the evaluation entry fields may be omitted, or none of the evaluation entry fields may be displayed. A praise operation icon ("LIKE" button icon) may be displayed instead of the evaluation point entry field 36.

The server system 1100 transmits the result of the operation input performed on the operation entry field to the video database 1200. The video database 1200 that has received the result of the operation input performed on the operation entry field updates the cumulative evaluation result data 405 (see FIG. 2). When the video database 1200 is implemented as part of the server system 1100, the server system 1100 updates the cumulative evaluation result data 405 (see FIG. 2).

When the server system 1100 has detected that a given video viewing end operation input has been performed using the user terminal 1500 (YES in step S60), the server system 1100 causes the user terminal 1500 to stop displaying the video player screen 34 (game play screen) (step S62), and resumes the game control process (step S64).

The server system 1100 repeats the steps S40 to S64 until a given play termination condition is satisfied (NO in step S70).

When the play termination condition has been satisfied (YES in step S70), the server system 1100 stores the save data 602 (see FIG. 10) based on the play data 700 (step S72). The server system 1100 then compares the play data 700 and the highlight definition data 530 (see FIG. 13). When the server system 1100 has determined that the current game play includes the highlight scene (YES in step S74), the server system 1100 performs an upload target video preparation process (step S76).

Figure 21:
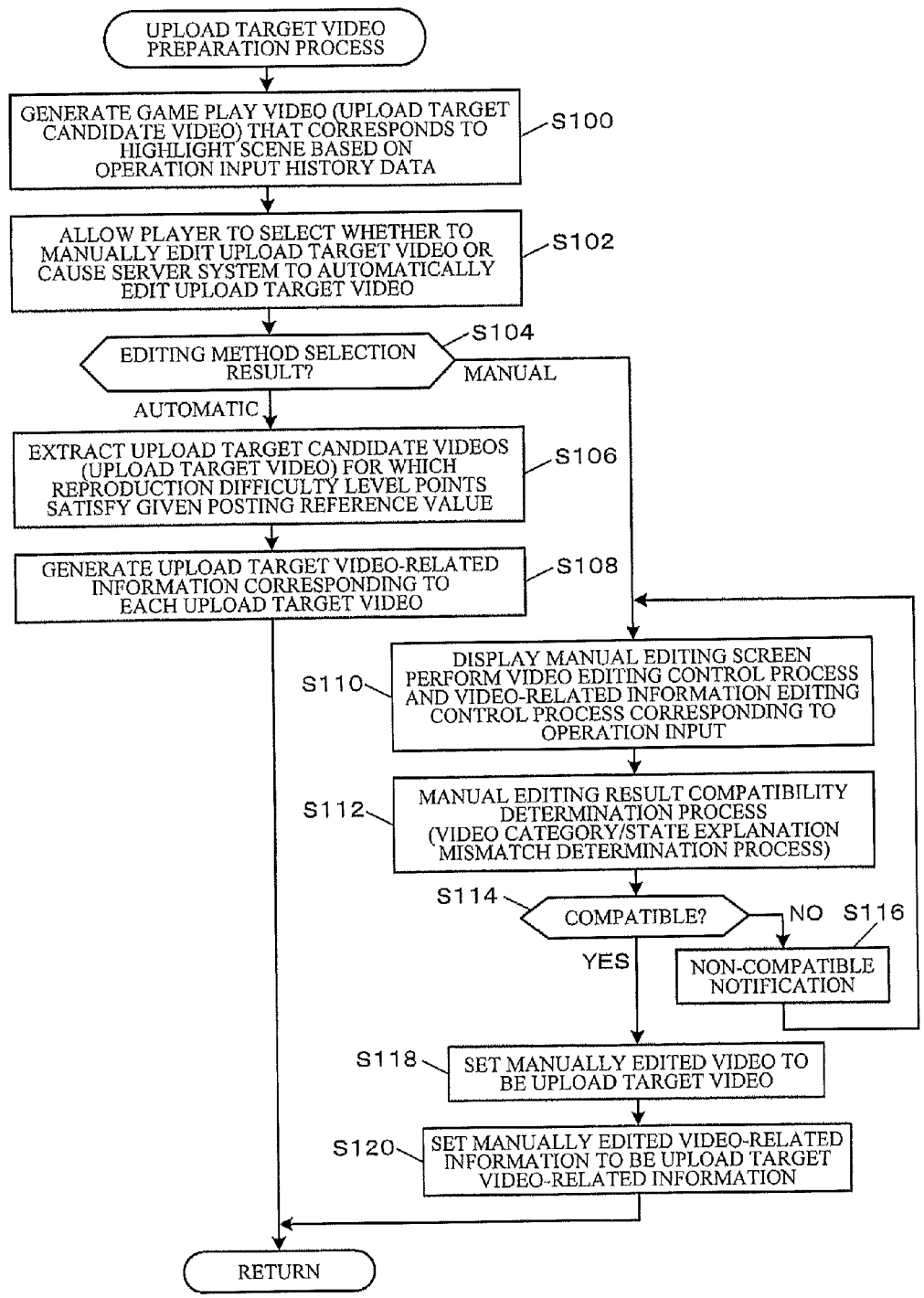
FIG. 21 is a flowchart illustrating the flow of an upload target video preparation process.

FIG. 21 is a flowchart illustrating the flow of the upload target video preparation process.

The server system 1100 generates the game play video (upload target candidate video) that corresponds to the highlight scene based on the operation input history data 710 (see FIG. 11) (step S100). For example, the server system 1100 generates the game play video for a given time including the highlight scene as the replay video, and generates the upload target candidate video data 743 (that is included in the upload target video editing data 740) (see FIG. 12).

The server system 1100 then causes the user terminal 1500 to display the selection screen that allows the player to select whether to manually edit the upload target video, or cause the server system 1100 to automatically edit the upload target video, and receives the result of selection by the player (step S102).

When the automatic editing method has been selected ("AUTOMATIC" in step S104), the server system 1100 refers to the reproduction difficulty level points 539 (see FIG. 13) included in the highlight definition data 530, and selects a given number of upload target candidate videos (upload target videos) for which the reproduction difficulty level points 539 satisfy a given posting reference value (step S106).

Specifically, the server system 1100 allocates a storage area for the upload history data 550, and sets the upload target video data 560 from the data of the selected upload target candidate videos (see FIG. 14). More specifically, the server system 1100 copies the upload target candidate video ID 743b included in the selected upload target candidate video data 743 (see FIG. 12) to the upload target video ID 561, and copies the game play video 743c included in the selected upload target candidate video data 743 to the game play video 562. The server system 1100 copies the corresponding highlight ID 743d included in the selected upload target candidate video data 743 to the corresponding highlight ID 563.

The server system 1100 then generates the upload target video-related information 570 corresponding to each upload target video (step S108 (see FIG. 14)).

Specifically, the server system 1100 copies the upload target video ID 561 included in the upload target video data 560 to the upload target video ID 517. The server system 1100 sets the current date/time to the play date/time 572. The server system 1100 sets the genre and the game title of the online game that is being played to the game genre 573 and the game title 574, and sets the user ID 701 (see FIG. 11) included in the play data 700 to the poster user ID 575.

The server system 1100 sets the play state 576 based on the parameter value included in the play data 700 that represents the play state. For example, the server system 1100 sets the number or the name of the game stage based on the game stage ID 706, the name of the dungeon in which the player character is situated (based on the player character control data 716), the name of the place name in the game world, or the like to the play state 576. Note that the play state 576 may be appropriately set taking account of the details of the game.

The server system 1100 copies the corresponding video category list 535 included in the highlight definition data 530 that corresponds to the corresponding highlight ID 563 to the video category 577.

The server system 1100 randomly selects (sets) one of the state explanations included in the state explanation list 537 included in the highlight definition data 530 that corresponds to the corresponding highlight ID 563 as the state explanation 578.

The server system 1100 copies the corresponding highlight ID 563 to the corresponding highlight ID 579.

The server system 1100 sets the poster's comments 580 to be empty.

When the server system 1100 has generated the upload target video-related information 570, the server system 1100 terminates the upload target video preparation process.

When the manual editing method has been selected in the step S104 ("MANUAL" in step S104), the server system 1100 causes the user terminal 1500 to display the manual editing screen for the video that is used as the material for the upload target video, and performs a video editing control process and a video-related information editing control process corresponding to the editing operation performed by the player (step S110).

Specifically, the server system 1100 generates the game replay video based on the replay data (e.g., operation input history data 710 and NPC control history data 712), and edits the video. The server system 1100 causes the user terminal 1500 to display the selection fields and the entry fields for the game genre, the game title, the play state, the video category, the state explanation, and the poster's comments included in the upload target video-related information 570, and allows the player to select or input each item. The editing data relating to the video and the video-related information is stored as the upload target video editing data 740 included in the play data 700 (see FIGS. 9 and 12). Note that the upload target video ID, the play date/time, and the poster user ID included in the video-related information editing data 747 are set automatically.

When the video and the video-related information have been manually edited, the server system 1100 performs a compatibility determination process that determines whether or not the edited video and the edited video-related information are compatible with each other (step S112).

Specifically, the server system 1100 determines the time zone of the game play that corresponds to the edited video with regard to the play state. The server system 1100 reads the replay data that corresponds to the time zone from the play data 700, and performs the compatibility determination process.

The server system 1100 determines the time zone of the game play that corresponds to the edited video with regard to the video category and the state explanation. The server system 1100 reads the replay data that corresponds to the time zone from the play data 700, and determines whether or not the highlight definition data 530 that corresponds to the play state exists. When the highlight definition data 530 that corresponds to the play state has been found, the server system 1100 compares the corresponding video category list 535 and the state explanation list 537 included in the definition data with the edited video-related information to make a determination. Even if the highlight definition data 530 that corresponds to the play state has not been found, the server system 1100 determines that the edited video and the edited video-related information are compatible with each other taking account of the player's intention.

When the edited video and the edited video-related information are not compatible with each other (NO in step S114), the server system 1100 notifies the player that the edited video and the edited video-related information are not compatible with each other (step S116).

When the edited video and the edited video-related information are compatible with each other (YES in step S114), the server system 1100 sets the manually edited video to be the upload target video (step S118), and sets the edited video-related information to be the upload target video-related information (step S120).

Specifically, the server system 1100 allocates a storage area for the upload history data 550 (see FIG. 14), automatically sets the upload target video ID 561 included in the upload target video data 560, and copies the manually edited video to the game play video 562. The server system 1100 sets the highlight ID included in the highlight definition data 530 determined by the step S112 to the corresponding highlight ID 563. The server system 1100 copies the manually edited video-related information to the upload target video-related information 570.

When the server system 1100 has set the upload target video data 560 and the upload target video-related information 570, the server system 1100 terminates the upload target video preparation process.

Figure 19:
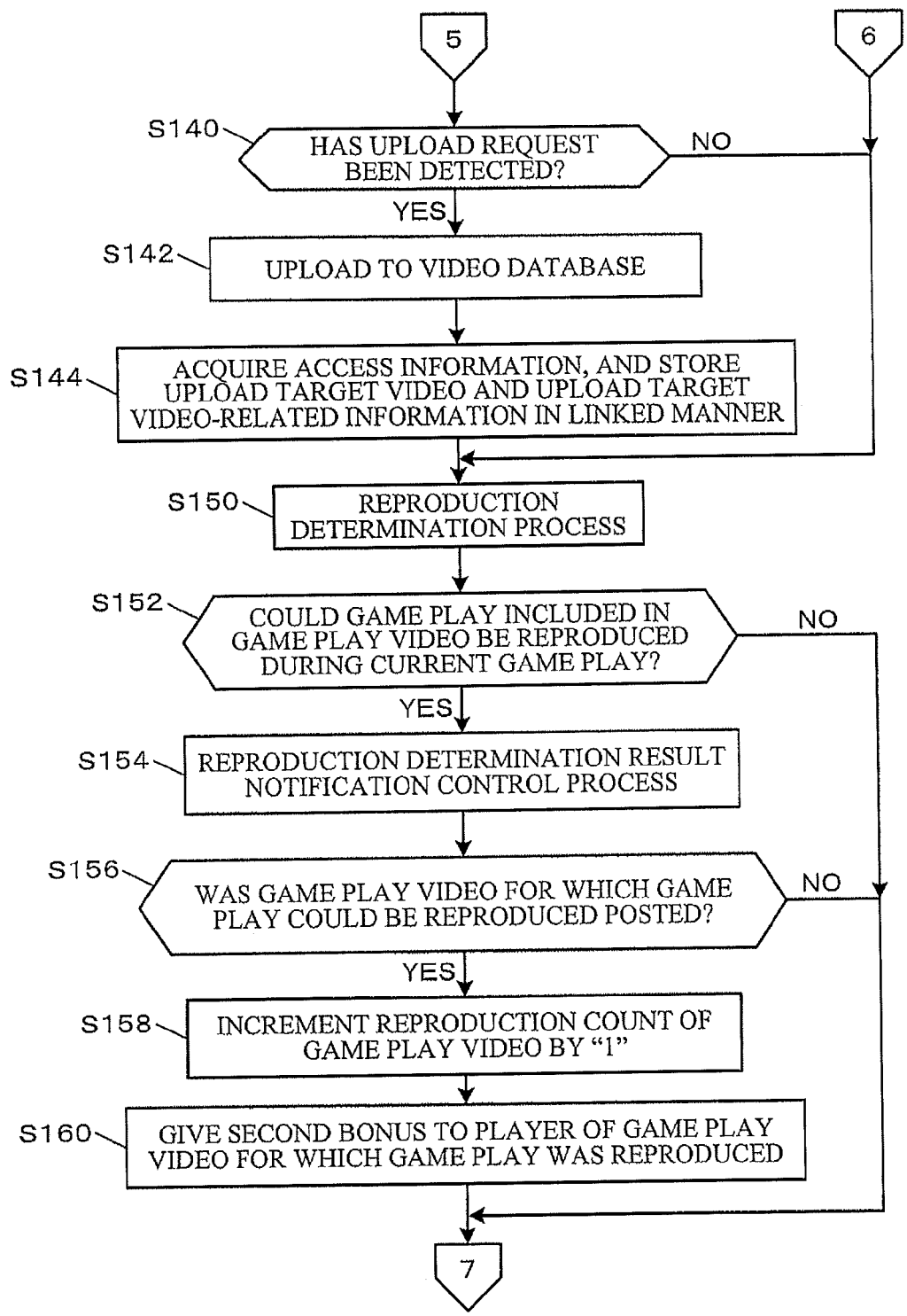
FIG. 19 is a flowchart that follows FIG. 18.

As illustrated in FIG. 19, when the server system 1100 has terminated the upload target video preparation process, the server system 1100 requests the player to indicate whether or not the player agrees to post the game play video using the user terminal 1500. When the player has performed an operation input that indicates that the player agrees to post the game play video, the server system 1100 determines that the upload request has been detected (YES in step S140), and uploads the upload target video to the video database (step S142).

Specifically, the server system 1100 sets the identification information about the posting destination video database 1200 to the upload destination video database ID 551 included in the upload history data 550 (see FIG. 14), sets the current date/time to the upload date/time 553, and sets the user ID 701 included in the play data 700 to the poster user ID 555. The server system 1100 then accesses the posting destination video database 1200, and automatically posts the game play video 562 included in the upload target video data 560, and the upload target video-related information 570. Note that it is desirable that the server system 1100 also delete the upload target video data 560 from the upload history data 550 to release the storage area.

When the video has been posted to the video database 1200, the access information is assigned to the video. The server system 1100 sets the access information assigned to the video to the access information 590 included in the upload history data 550 (step S144).

The server system 1100 then performs a reproduction determination process on the current game play (step S150).

Specifically, the server system 1100 refers to the video viewing history data 620 included in the user management data 600 of the player (see FIG. 10), accesses the video database 1200 using the viewed video access information 622, and acquires the video-related information 403 (see FIG. 2) that corresponds to the viewed game play video.

When the game play video was previously uploaded by the server system 1100, the corresponding highlight ID 579 (see FIG. 14) is included in the acquired video-related information 403. Therefore, the server system 1100 compares the highlight definition data 530 that corresponds to the corresponding highlight ID 579 with the replay data (see FIG. 11) included in the play data 700, and determines that the game play could be reproduced when the same highlight scene has been detected from the current game play.

When the game play video was uploaded by a computer other than the server system 1100, the server system 1100 compares the acquired video-related information 403 with the definition included in the highlight definition data 530, the corresponding video category list 535, and the state explanation list 537 to determine whether or not the corresponding highlight scene is present.

The server system 1100 determines that the game play was not reproduced when the corresponding highlight scene has not been found. When the corresponding highlight scene has been found, the server system 1100 compares the highlight definition data 530 with the replay data included in the play data 700, and determines that the game play could be reproduced when the same highlight scene has been detected from the current game play.

When it has been determined that the game play could be reproduced (YES in step S152), the server system 1100 causes the user terminal 1500 to notify the player that the game play could be reproduced (step S154).

When the game play video for which it has been determined that the game play could be reproduced is the game play video that was posted corresponding to the upload request (i.e., the game play video represented by the upload history data 550) (YES in step S156), the server system 1100 increments the reproduction count 594 included in the upload history data 550 of the game play video by "1" (step S158).

The server system 1100 refers to the second bonus definition data 672, and changes the save data 602 included in the user management data 600 of the player so that the second bonus that corresponds to the reproduction count 594 is given to the player of the game play video for which the game play was reproduced (step S160).

Figure 20:
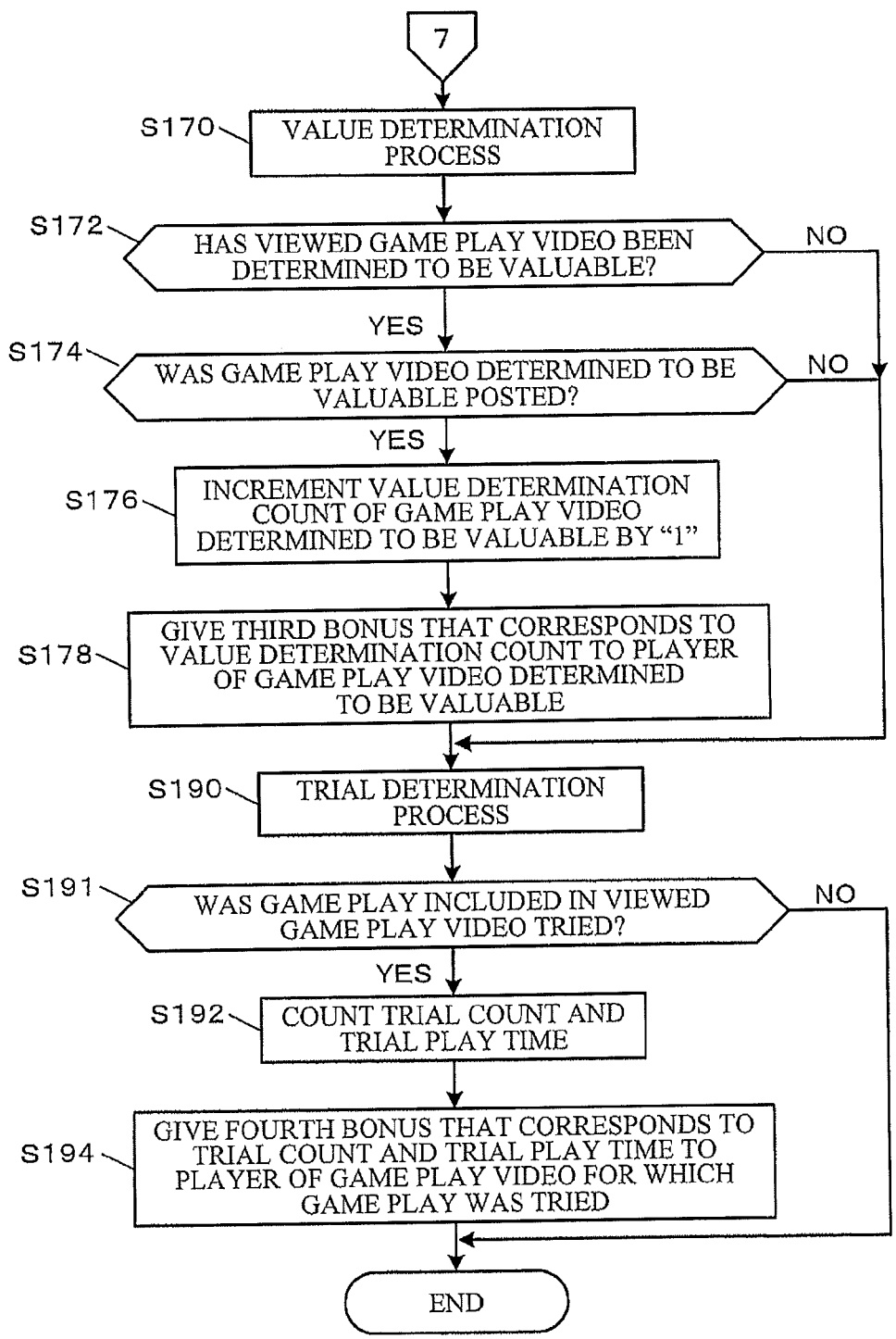
FIG. 20 is a flowchart that follows FIG. 19.

As illustrated in FIG. 20, the server system 1100 then performs a value determination process on the game play video viewed by the player during the current game play (step S170).

Specifically, the server system 1100 refers to the video viewing history data 620 included in the user management data 600 of the player, extracts the game play video viewed by the player during the current game play, and performs the value determination process on the extracted game play video to determine whether or not the extracted game play video was valuable for the player. Specifically, the server system 1100 determines that the game play video viewed by the player during the current game play was valuable for the player when the play result of the current game play is equal to or better than the play result of the game play video that corresponds to the access information search request issued during the current game play.

The server system 1100 then accesses the game play video viewed during the current game play, and acquires the video-related information 403. When the game play video was previously posted by the server system 1100, the corresponding highlight ID is included in the acquired video-related information 403. In this case, the server system 1100 reads the reproduction difficulty level points 539 included in the highlight definition data 530 that corresponds to the corresponding highlight ID.

The server system 1100 compares the replay data of the current game play with the highlight definition data 530, and generates a list of the reproduction difficulty level points 539 corresponding to each highlight scene included in the current game play. When the reproduction difficulty level points 539 corresponding to each highlight scene included in the current game play are higher than the reproduction difficulty level points 539 of the game play video viewed during the current game play, the server system 1100 determines that the value condition is satisfied, and the game play video viewed during the current game play was valuable.

When the play result data 770 (e.g., final game points) is included in the acquired video-related information 403 as the play result, the server system 1100 may compare the play result data 770 included in the acquired video-related information 403 with the play result data 770 of the current game play, and determine that the value condition is satisfied, and the game play video viewed during the current game play was valuable when the play result data 770 of the current game play is better than the play result data 770 included in the acquired video-related information 403.

When it has been determined that the game play video viewed during the current game play was valuable (YES in step S172), and the game play video that has been determined to be valuable is the video that was previously posted by the server system 1100 (YES in step S174), the server system 1100 increments the value determination count 596 (see FIG. 14) of the game play video by "1" (step S176). The server system 1100 refers to the third bonus definition data 673, and gives the third bonus that corresponds to the value determination count 596 to the player of the game play video (step S178).

The server system 1100 then performs a trial determination process that determines whether or not the game play included in the game play video viewed by the player during the current game play was tried (step S190).

Specifically, the server system 1100 acquires the video-related information 403 that corresponds to the game play video viewed during the current game play from the video database 1200, and determines the highlight scene included in the game play video. The server system 1100 compares the definition parameter value list 533 included in the highlight definition data 530 that corresponds to the highlight scene included in the game play video with the replay data included in the play data 700.

The server system 1100 determines that the game play included in the game play video viewed by the player during the current game play was tried when the replay data is similar to the data included in the definition parameter value list 533. More specifically, when 50% or more and less than 100% of the technique command inputs set to the used technique type condition 533e have been detected from the operation input history data 710, the server system 1100 determines that the trial condition is satisfied, and the game play included in the game play video viewed by the player during the current game play was tried.

When the game play video viewed during the current game play includes a video for which the game play was tried (YES in step S191), the server system 1100 counts the trial count and the total time required for the trial (i.e., trial play time) (step S192), refers to the fourth bonus definition data 674 (see FIG. 9), gives the fourth bonus that corresponds to the trial count and the trial play time to the player of the game play video (step S194), and terminates the process.

Figure 22:
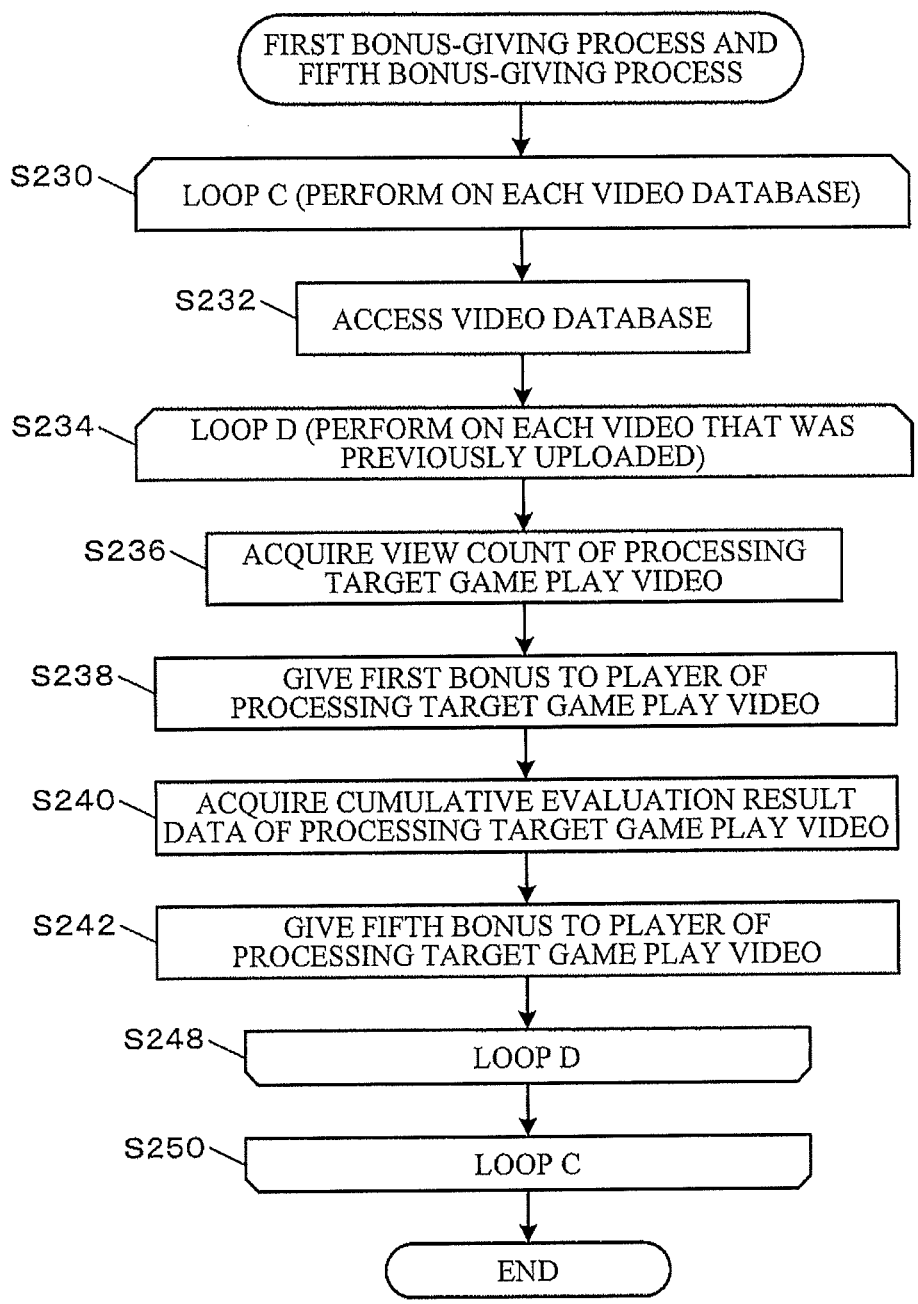
FIG. 22 is a flowchart illustrating the flow of a first bonus-giving process and a fifth bonus-giving process.

FIG. 22 is a flowchart illustrating the flow of the first bonus-giving process and the fifth bonus-giving process that are periodically performed by the server system 1100.

The server system 1100 performs a loop C process on each video database 1200 registered in advance (steps S230 to S250).

The loop C process includes accessing the processing target video database 1200 (step S232), and performing a loop D process on each game play video that was previously uploaded by the server system 1100 (i.e., each video represented by the upload history data 550) (steps S234 to S248).

The loop D process includes reading the access information 590 from the upload history data 550 (see FIG. 14) that corresponds to the processing target game play video, and accessing the processing target game play video stored in the video database 1200 using the access information. The view count 404 (see FIG. 2) is obtained from the video database 1200, and the server system 1100 stores the view count 404 as the view count 592 included in the upload history data 550 that corresponds to the game play video (step S236).

The server system 1100 refers to the first bonus definition data 671 (see FIG. 9), and gives the first bonus that corresponds to the view count 592 to the player of the processing target game play video (i.e., the user represented by the poster user ID 555 included in the upload history data 550 that corresponds to the processing target game play video) (step S238).

The server system 1100 then acquires the cumulative evaluation result data 405 (see FIG. 2) that corresponds to the processing target game play video from the video database 1200 (step S240).

The server system 1100 refers to the fifth bonus definition data 675 (see FIG. 9), gives the fifth bonus that corresponds to the acquired cumulative evaluation result data 405 to the player of the processing target game play video (step S242), and terminates the loop D process (step S248).

When the server system 1100 has performed the loop D process on all of the game play videos previously uploaded by the server system 1100, the server system 1100 terminates the loop D (step S250). When the server system 1100 has performed the loop C process on all of the video databases 1200 registered in advance, the server system 1100 terminates the first bonus-giving process and the fifth bonus-giving process.

According to the first embodiment, it is possible to provide novel game play video-sharing technology that improves convenience, and improves game playability based on the game play video-sharing process.

Second Embodiment

A second embodiment to which the invention is applied is described below. The second embodiment differs from the first embodiment in that a function that adds an advertisement to the upload target video is additionally provided. Note that the differences from the first embodiment are mainly described below. The same elements as those described above in connection with the first embodiment are indicated by the same reference signs (symbols), and detailed description thereof is omitted.

Figure 23:
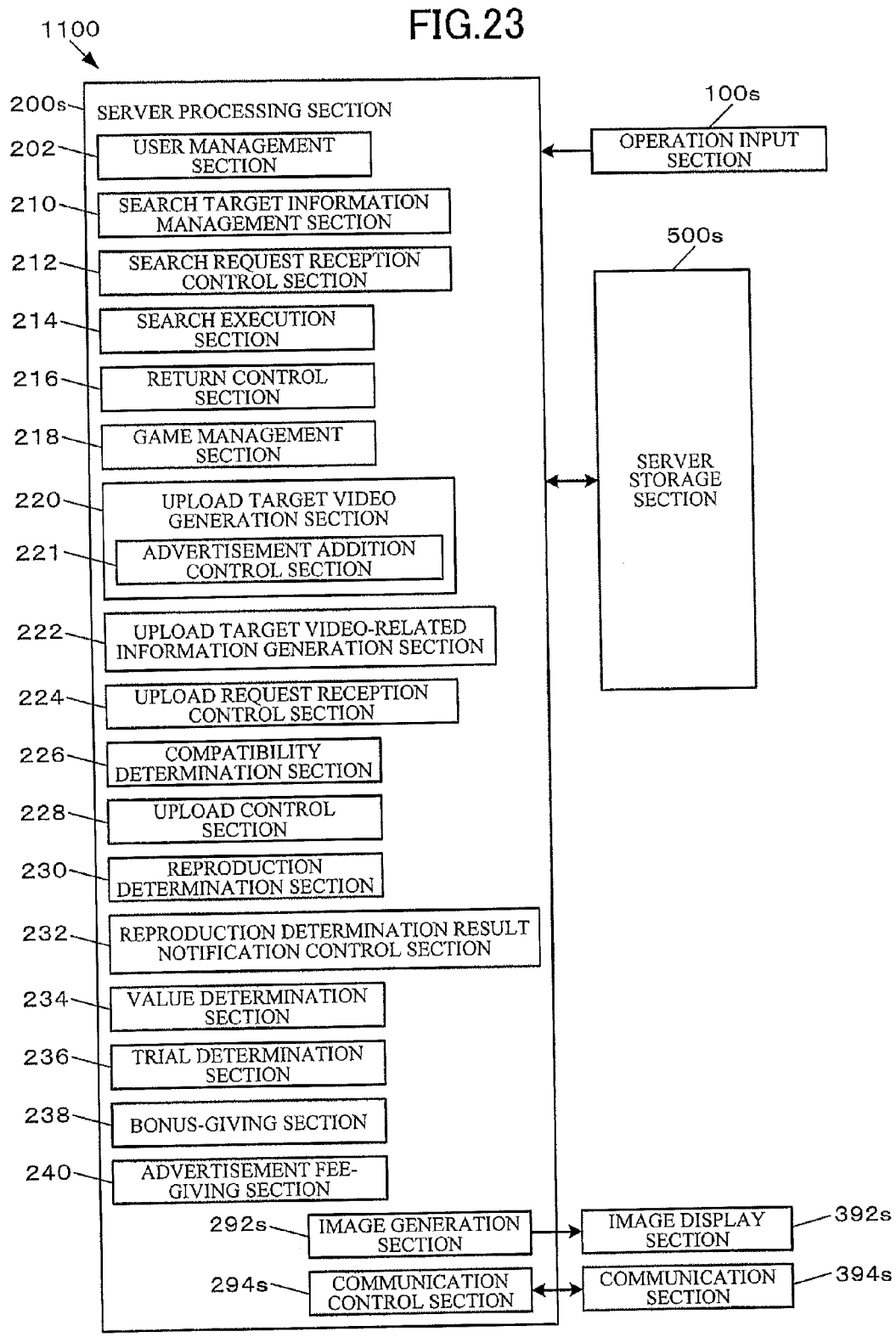
FIG. 23 is a functional block diagram illustrating a functional configuration example of a server system (second embodiment).

FIG. 23 is a view illustrating a functional configuration example of the server system 1100 according to the second embodiment.

Figure 24:
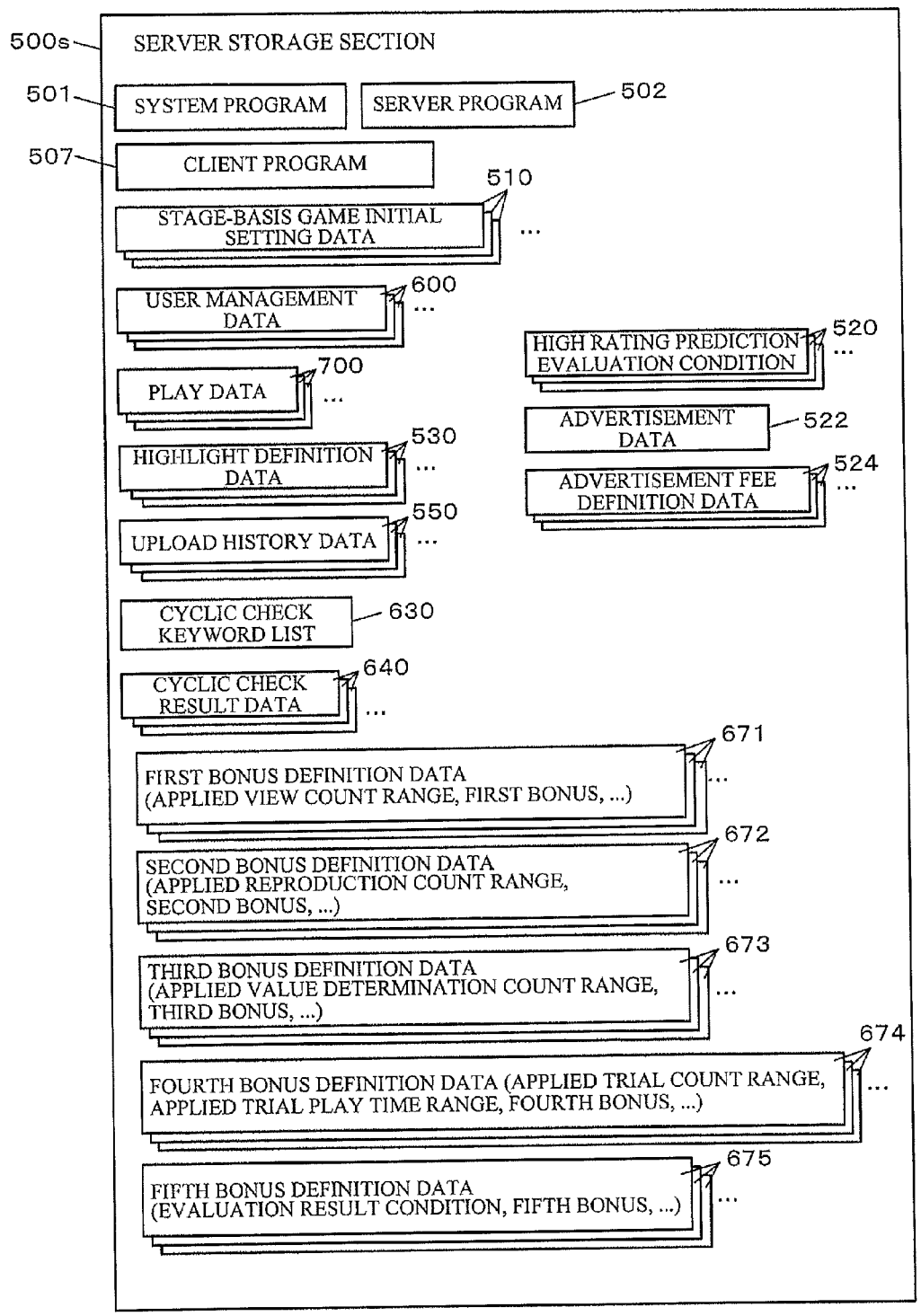
FIG. 24 is a view illustrating an example of a program and data that are stored in a server storage section (second embodiment).

The server processing section 200s according to the second embodiment includes an advertisement fee-giving section 240, and the upload target video generation section 220 includes an advertisement addition control section 221. As illustrated in FIG. 24, the server storage section 500s according to the second embodiment stores a high rating prediction evaluation condition 520, advertisement data 522, and advertisement fee definition data 524.

The advertisement addition control section 221 determines whether or not the upload target video satisfies the high rating prediction evaluation condition that is satisfied when the upload target video is predicted to be a video that is considered to be viewed constantly. The high rating prediction evaluation condition may be set based on whether or not the poster is a specific poster designated in advance, whether or not the upload target video includes specific super play, whether or not the posting date/time falls within a specific notification encouragement period from the start of the game service, and the like. The high rating prediction evaluation condition 520 is provided corresponding to each high rating prediction evaluation condition.

The advertisement addition control section 221 adds (synthesizes) an advertisement defined by the advertisement data 522 provided in advance to the video when the high rating prediction evaluation condition is satisfied. When the video includes specific super play, the advertisement is added to the super play scene and/or added to precede or follow the super play scene. When the video does not include specific super play, the advertisement is added to be displayed after a given time has elapsed from the start of the video. The advertisement may be a banner-like advertisement image, or may be a scrolling text.

The advertisement addition control section 221 adds given advertisement addition index information that represents the addition of the advertisement to the video-related information that corresponds to the game play video to which the advertisement is added.

The advertisement fee-giving section 240 gives an advertisement fee to the player (user) of the game play video to which the advertisement is added. Specifically, the advertisement fee-giving section 240 refers to the cyclic check result data 640 (see FIG. 15), and gives a bonus to the player based on the view count 647 or the cumulative evaluation result data 650 of the game play video to which the advertisement is added (i.e., a video that is linked to the video-related information 646 that includes given information that represents the addition of the advertisement). For example, a better bonus is given to the player as the view count 647 increases. The advertisement fee definition data 524 is provided corresponding to each bonus so as to be linked to a bonus selection condition.

Figure 25:
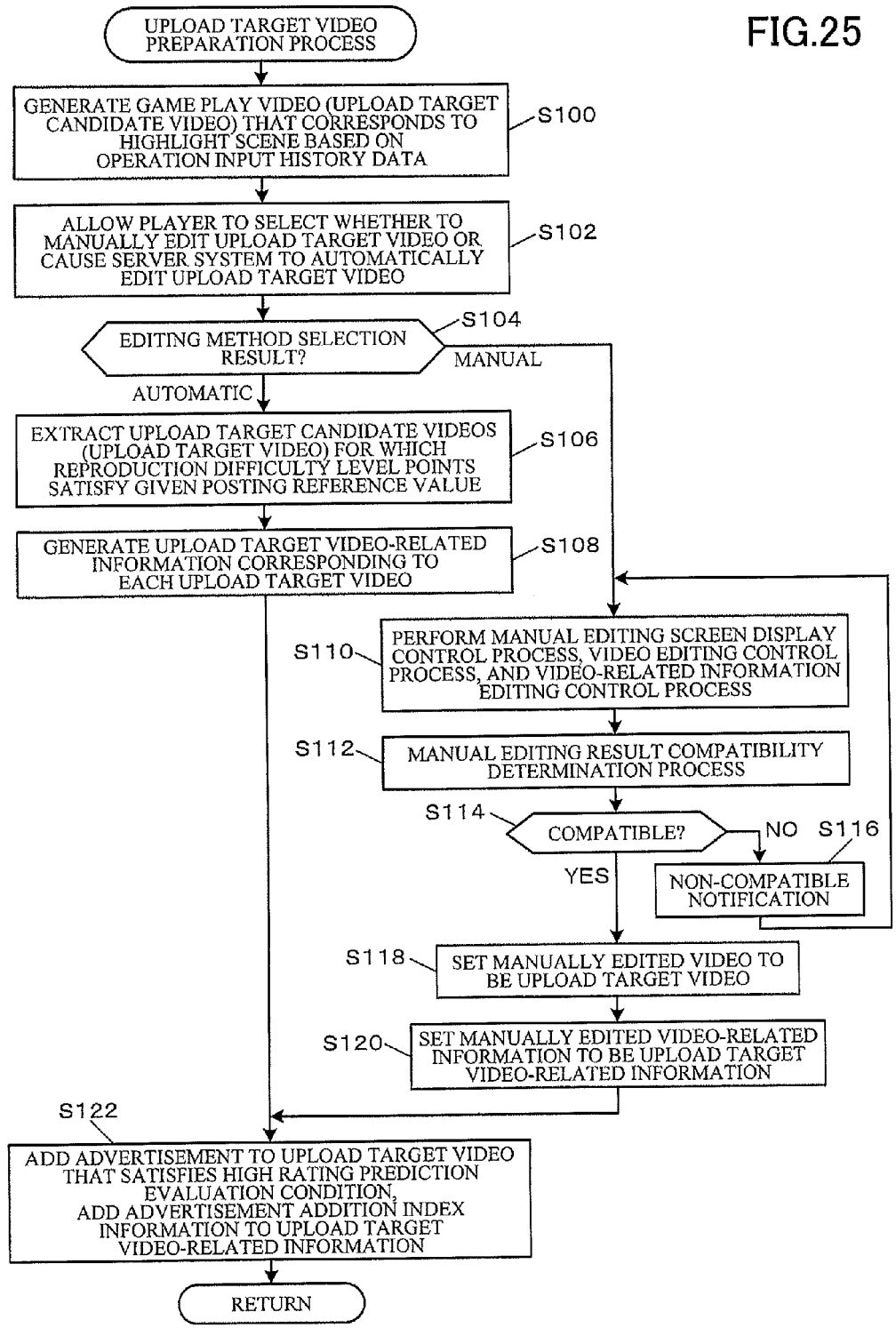
FIG. 25 is a flowchart illustrating the flow of an upload target video preparation process (second embodiment).

FIG. 25 is a flowchart illustrating the flow of the upload target video preparation process according to the second embodiment. The flow of the upload target video preparation process according to the second embodiment is basically the same as described above in connection with the first embodiment, except that the server system 1100 performs a control process that adds an advertisement to the upload target video that satisfies the high rating prediction evaluation condition 520, and adds given advertisement addition index information to the upload target video-related information that corresponds to the upload target video (step S122).

Figure 26:
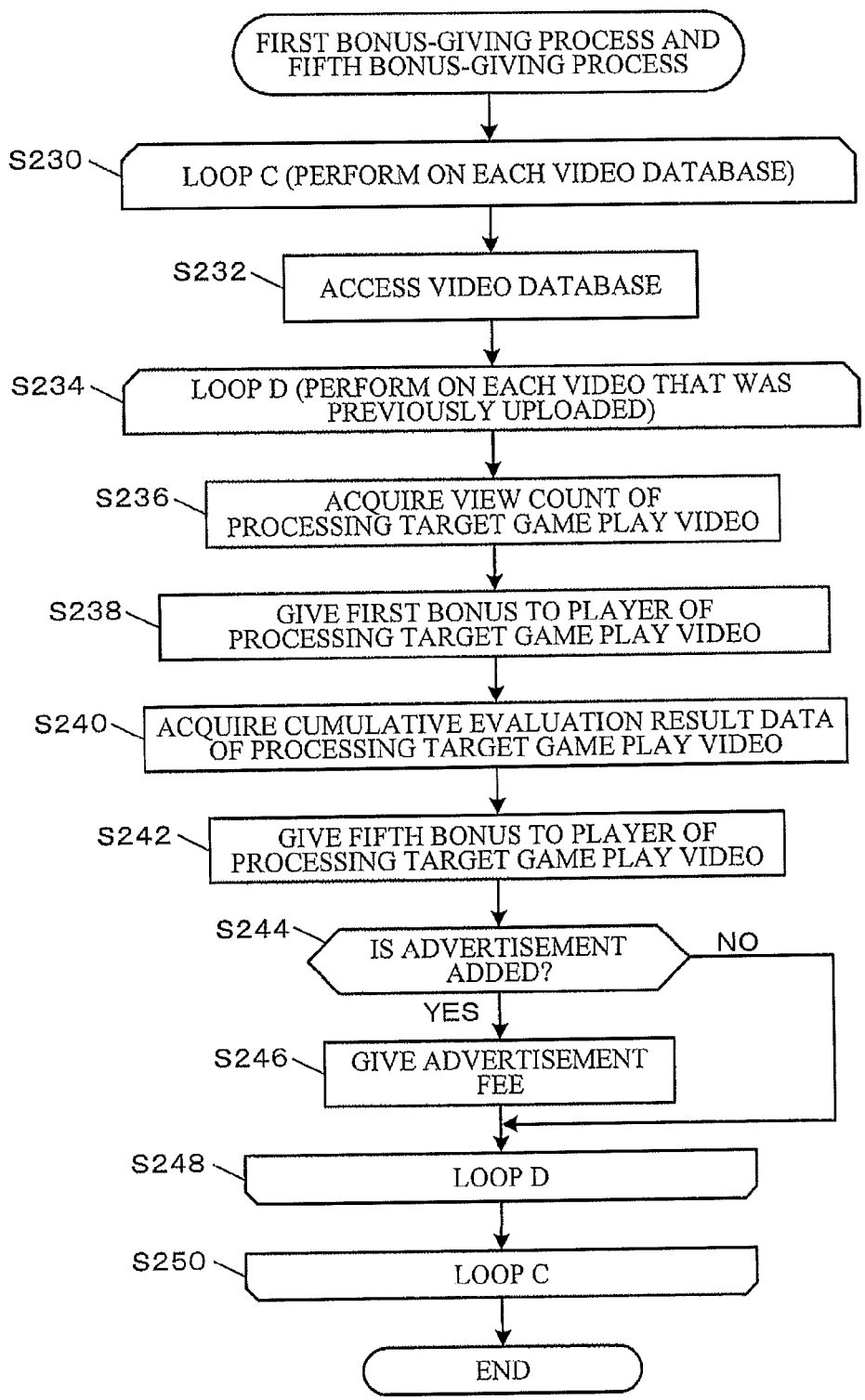
FIG. 26 is a flowchart illustrating the flow of a first bonus-giving process and a fifth bonus-giving process (second embodiment).

FIG. 26 is a flowchart illustrating the flow of the first bonus-giving process and the fifth bonus-giving process according to the second embodiment. The flow of the first bonus-giving process and the fifth bonus-giving process according to the second embodiment is basically the same as described above in connection with the first embodiment, except that the server system 1100 refers to the video-related information that corresponds to the game play video subjected to the loop D process after the step S242, and determines whether or not the game play video is a video to which an advertisement is added in the step S122. When the game play video is a video to which an advertisement is added in the step S122 (YES in step S244), the server system 1100 gives a bonus (advertisement fee) to the player of the game play video (step S246).

Modifications

The embodiments to which the invention is applied have been described above. Note that the invention is not limited to the above embodiments. Various modifications may be appropriately made, such as adding other elements, omitting some of the elements, or changing some of the elements.

Although the above embodiments have been described taking an example in which the invention is applied to an online game, the invention may also be applied to a stand-alone game that can be executed by the user terminal 1500 alone.

For example, the configuration of the game management section 218 illustrated in FIG. 8 is implemented by the user terminal 1500. Specifically, the steps S24 to S44 illustrated in FIG. 17 and the steps S50 to S72 illustrated in FIG. 18 are performed by the user terminal 1500. The user terminal 1500 transmits the replay data to the server system 1100 after completion of game play, and the server system 1100 performs the step S74 and the subsequent steps illustrated in FIGS. 18 to 20 based on the replay data.

Alternatively, the user terminal 1500 performs the steps S24 to S44 illustrated in FIG. 17 and the steps S50 to S76 illustrated in FIG. 18. The user terminal 1500 performs the step S110 illustrated in FIG. 21 after completion of game play, the player manually edit the posting target game play video using the user terminal 1500, and the user terminal 1500 posts the manually edited game play video to the video database 1200. The user terminal 1500 transmits the access information acquired from the video database 1200 and the posted video-related information to the server system 1100. The server system 1100 then generates and stores the upload history data 550 (search target information) based on the received information (the upload target video data 560 is omitted in this case), and performs the step S150 and the subsequent steps illustrated in FIGS. 18 to 20.

Alternatively, the user terminal 1500 performs the steps S24 to S44 illustrated in FIG. 17 and the steps S50 to S76 illustrated in FIG. 18. The user terminal 1500 performs the step S110 illustrated in FIG. 21 after completion of game play, and the player manually edit the posting target game play video and the video-related information using the user terminal 1500. The user terminal 1500 then transmits the upload request to the server system 1100 together with the edited game play video (upload target video) and the edited video-related information (upload target video-related information). The server system 1100 then performs the step S140 and the subsequent steps illustrated in FIG. 19.

A function that encodes the video-related information may be provided to the upload target video-related information generation section 222 (see FIG. 8). In this case, a function that decodes the encoded video-related information is provided to the search target information management section 210 and the search execution section 214.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A server system comprising:
    at least one processor or circuit programmed to function as:
        a communication section that communicates with a video database through a communication line connected to the server system, the video database providing a game play video through the communication line so as to be viewable, the game play video being linked to video-related information, the video-related information being at least one of: 1) information about the game play video that is input by an uploader, and 2) information about the game play video that is input automatically;
a search target information management section that manages search target information, and that searches the video database for the game play video based on the video-related information;
a reception section that receives a search request from a first user terminal while the first user is playing a game on the first user terminal;
a search section that searches the video database for the game play video and selects the game play video based on the search target information that corresponds to the search request;
a return section that returns access information to the first user terminal, the access information including a location in the video database corresponding to the selected game play video found by the search section; and
the first user plays the selected game play video that is displayed on the screen of the first user terminal when a playing game by the first user is suspended.

2. The server system as defined in claim 1,
wherein the search section searches the video database for the game play video while searching for the video-related information that corresponds to game play information about game play performed using the first user terminal based on the search target information.

3. The server system as defined in claim 1,
wherein the search target information management section manages the search target information based on the video-related information.

4. The server system as defined in claim 1,
wherein the video database manages viewing information that includes at least a view count of each game play video, and
the search target information management section manages the search target information based on the viewing information.

5. The server system as defined in claim 4,
wherein the return section returns at least the access information about the game play video of which the view count has satisfied a given higher-order condition.

6. The server system as defined in claim 4,
wherein the search section searches the video database for the game play video while searching for the search target information that corresponds to the search request based on the viewing information.

7. The server system as defined in claim 1, further comprising:
an upload request reception section that receives an upload request from a second user terminal, the upload request designating an upload target video and upload target video-related information, the upload target video being the game play video that is desired to be uploaded, and the upload target video-related information being the video-related information that is linked to the upload target video; and
an upload section that uploads the upload target video and the upload target video-related information to the video database.

8. The server system as defined in claim 7,
wherein the upload target video-related information includes information that represents the uploader who desires to upload the upload target video.

9. The server system as defined in claim 8, further comprising:

a compatibility determination section that determines whether or not the upload target video and the upload target video-related information designated by the upload request received by the upload request reception section satisfy a given compatibility condition,
wherein the upload section uploads the upload target video and the upload target video-related information that have been determined by the compatibility determination section to satisfy the compatibility condition to the video database.

10. The server system as defined in claim 1,
the server system having a game server function, and further comprising:
an upload target video generation section that generates an upload target video based on game play performed using a second user terminal managed by the game server function, the upload target video being the game play video that is to be uploaded;
an upload target video-related information generation section that generates upload target video-related information, the upload target video-related information being the video-related information that is linked to the upload target video; and
an upload section that uploads the upload target video and the upload target video-related information to the video database in a linked manner.

11. The server system as defined in claim 7, further comprising:
a first bonus-giving processing section that performs a first bonus-giving process that gives a given bonus to the uploader who uploaded the game play video when management information about the game play video managed by the video database has satisfied a given bonus-giving condition.

12. The server system as defined in claim 11,
wherein the management information includes at least a view count of the game play video, and
the first bonus-giving processing section determines whether or not the management information has satisfied the bonus-giving condition using the view count, and gives the given bonus to the uploader who uploaded the game play video for which the management information has satisfied the bonus-giving condition.

13. The server system as defined in claim 1,
the server system having a game server function, and further comprising:
a reproduction determination section that determines whether or not game play performed using the first user terminal managed by the game server function after the return section has returned the access information to the first user terminal has satisfied a given reproduction condition referring to the video-related information linked to the game play video, the given reproduction condition being satisfied when the game play performed using the first user terminal is identical or similar to game play included in the game play video that is linked to the video-related information; and
a reproduction determination result notification control section that notifies the first user terminal that the game play performed using the first user terminal has satisfied the given reproduction condition when the reproduction determination section has determined that the game play performed using the first user terminal has satisfied the given reproduction condition.

14. The server system as defined in claim 7,
the server system having a game server function, and further comprising:
a reproduction determination section that determines whether or not game play performed using the first user terminal managed by the game server function after the return section has returned the access information to the first user terminal has satisfied a given reproduction condition referring to the video-related information linked to the game play video, the given reproduction condition being satisfied when the game play performed using the first user terminal is identical or similar to game play included in the game play video that is linked to the video-related information; and
a second bonus-giving processing section that performs a second bonus-giving process that gives a given bonus to a user of the second user terminal who is linked to the game play video when the reproduction determination section has determined that the given reproduction condition has been satisfied, and the game play video subjected to the determination is a video that was uploaded by the upload section.

15. The server system as defined in claim 7,
the server system having a game server function, and further comprising:
a value determination section that determines whether or not game play performed using the first user terminal managed by the game server function after the return section has returned the access information to the first user terminal has satisfied a given value condition referring to the video-related information linked to the game play video, the given value condition being satisfied when a play result of the game play performed using the first user terminal was identical to, or better than, that of game play included in the game play video that is linked to the video-related information; and
a third bonus-giving processing section that performs a third bonus-giving process that gives a given bonus to a user of the second user terminal who is linked to the game play video when the value determination section has determined that the given value condition has been satisfied, and the game play video subjected to the determination is a video that was uploaded by the upload section.

16. The server system as defined in claim 7,
the server system having a game server function, and further comprising:
a trial determination section that determines whether or not game play performed using the first user terminal managed by the game server function after the return section has returned the access information to the first user terminal has satisfied a given trial condition referring to the video-related information linked to the game play video, the given trial condition being satisfied when the game play performed using the first user terminal was in line with game play included in the game play video that is linked to the video-related information; and
a fourth bonus-giving processing section that performs a fourth bonus-giving process that gives a given bonus to a user of the second user terminal who is linked to the game play video when the trial determination section has determined that the given trial condition has been satisfied, and the game play video subjected to the determination is a video that was uploaded by the upload section.

17. The server system as defined in claim 16,
wherein the fourth bonus-giving processing section changes the bonus that is given to the user corresponding to a trial play time or a trial play count of the game play performed using the first user terminal for which the trial determination section has determined that the given trial condition has been satisfied.

18. The server system as defined in claim 1,
wherein the video-related information includes at least one of a game title, a game category, a game stage, and play result information.

19. The server system as defined in claim 1, further comprising the video database.

20. The server system as defined in claim 1,
wherein the video-related information is stored in the video database in an encoded state,
the server system further comprising a decoder section that decodes the encoded video-related information.

21. A server system having a game server function, the server system comprising:
at least one processor or circuit programmed to function as:
a communication section that communicates with a video database through a communication line connected to the server system, the video database providing a game play video through the communication line so as to be viewable, the game play video being linked to video-related information, the video-related information being at least one of: 1) information about the game play video that is input by an uploader, and 2) information about the game play video that is input automatically;
a search target information management section that manages search target information, and that searches the video database for the game play video based on the video-related information;
a reception section that receives a search request from a first user terminal while the first user is playing a game on the first user terminal;
a search section that searches the video database for the game play video and selects the game play video based on the search target information that corresponds to the search request;
a return section that returns access information to the first user terminal, the access information including a location in the video database corresponding to the selected game play video found by the search section;
an upload request reception section that receives an upload request from a second user terminal, the upload request designating an upload target video and upload target video-related information, the upload target video being the game play video that is desired to be uploaded, and the upload target video-related information being the video-related information that is linked to the upload target video;
an upload section that uploads the upload target video and the upload target video-related information to the video database;
a reproduction determination section that determines whether or not game play performed using the first user terminal managed by the game server function after the return section has returned the access information to the first user terminal has satisfied a given reproduction condition referring to the video-related information linked to the game play video, the given reproduction condition being satisfied when the game play performed using the first user terminal is identical or similar to game play included in the game play video that is linked to the video-related information; and
a second bonus-giving processing section that performs a second bonus-giving process that gives a given bonus to a user of the second user terminal who is linked to the game play video when the reproduction determination section has determined that the given reproduction condition has been satisfied, and the game play video subjected to the determination is a video that was uploaded by the upload section.

22. A server system having a game server function, the server system comprising:
    at least one processor or circuit programmed to function as:
        a communication section that communicates with a video database through a communication line connected to the server system, the video database providing a game play video through the communication line so as to be viewable, the game play video being linked to video-related information, the video-related information being at least one of: 1) information about the game play video that is input by an uploader, and 2) information about the game play video that is input automatically;
        a search target information management section that manages search target information, and that searches the video database for the game play video based on the video-related information;
        a reception section that receives a search request from a first user terminal while the first user is playing a game on the first user terminal;
        a search section that searches the video database for the game play video and selects the game play video based on the search target information that corresponds to the search request;
        a return section that returns access information to the first user terminal, the access information including a location in the video database corresponding to the selected game play video found by the search section;
        an upload request reception section that receives an upload request from a second user terminal, the upload request designating an upload target video and upload target video-related information, the upload target video being the game play video that is desired to be uploaded, and the upload target video-related information being the video-related information that is linked to the upload target video;
        an upload section that uploads the upload target video and the upload target video-related information to the video database;
        a value determination section that determines whether or not game play performed using the first user terminal managed by the game server function after the return section has returned the access information to the first user terminal has satisfied a given value condition referring to the video-related information linked to the game play video, the given value condition being satisfied when a play result of the game play performed using the first user terminal was identical to, or better than, that of game play included in the game play video that is linked to the video-related information; and
        a third bonus-giving processing section that performs a third bonus-giving process that gives a given bonus to a user of the second user terminal who is linked to the game play video when the value determination section has determined that the given value condition has been satisfied, and the game play video subjected to the determination is a video that was uploaded by the upload section.

23. A server system having a game server function, the server system comprising:
    at least one processor or circuit programmed to function as:
        a communication section that communicates with a video database through a communication line connected to the server system, the video database providing a game play video through the communication line so as to be viewable, the game play video being linked to video-related information, the video-related information being at least one of: 1) information about the game play video that is input by an uploader, and 2) information about the game play video that is input automatically;
        a search target information management section that manages search target information, and that searches the video database for the game play video based on the video-related information;
        a reception section that receives a search request from a first user terminal while the first user is playing a game on the first user terminal;
        a search section that searches the video database for the game play video and selects the game play video based on the search target information that corresponds to the search request;
        a return section that returns access information to the first user terminal, the access information including a location in the video database corresponding to the selected game play video found by the search section;
        an upload request reception section that receives an upload request from a second user terminal, the upload request designating an upload target video and upload target video-related information, the upload target video being the game play video that is desired to be uploaded, and the upload target video-related information being the video-related information that is linked to the upload target video;
        an upload section that uploads the upload target video and the upload target video-related information to the video database;
        a trial determination section that determines whether or not game play performed using the first user terminal managed by the game server function after the return section has returned the access information to the first user terminal has satisfied a given trial condition referring to the video-related information linked to the game play video, the given trial condition being satisfied when the game play performed using the first user terminal was in line with game play included in the game play video that is linked to the video-related information; and
        a fourth bonus-giving processing section that performs a fourth bonus-giving process that gives a given bonus to a user of the second user terminal who is linked to the game play video when the trial determination section has determined that the given trial condition has been satisfied, and the game play video subjected to the determination is a video that was uploaded by the upload section.

* * * * *